US011869400B2

(12) United States Patent
Kwon et al.

(10) Patent No.: US 11,869,400 B2
(45) Date of Patent: Jan. 9, 2024

(54) DISPLAY APPARATUS AND METHOD OF DRIVING THE SAME

(71) Applicant: Samsung Display Co., Ltd., Yongin-Si (KR)

(72) Inventors: Sangan Kwon, Cheonan-si (KR); Soon-Dong Kim, Osan-si (KR); Taehoon Kim, Hwaseong-si (KR); Eun Sil Yun, Hwaseong-si (KR); Changnoh Yoon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/566,385

(22) Filed: Dec. 30, 2021

(65) Prior Publication Data

US 2022/0351659 A1 Nov. 3, 2022

(30) Foreign Application Priority Data

Apr. 30, 2021 (KR) ........................ 10-2021-0056672

(51) Int. Cl.
*G09G 3/20* (2006.01)

(52) U.S. Cl.
CPC ....... *G09G 3/20* (2013.01); *G09G 2300/0842* (2013.01); *G09G 2310/027* (2013.01); *G09G 2310/0267* (2013.01); *G09G 2310/08* (2013.01); *G09G 2320/0233* (2013.01); *G09G 2340/0435* (2013.01)

(58) Field of Classification Search
CPC ... G09G 2300/0819; G09G 2300/0842; G09G 3/3233
See application file for complete search history.

(56) References Cited

U.S. PATENT DOCUMENTS

2011/0157067 A1* 6/2011 Wagner ............... G06F 3/04166 345/174
2017/0270882 A1* 9/2017 Mori ..................... G06F 3/0412
2018/0190224 A1* 7/2018 Kim ....................... G09G 3/342
2021/0335272 A1* 10/2021 Chung ................. G09G 3/3275

FOREIGN PATENT DOCUMENTS

KR 10-2017-0108840 A 9/2017
KR 10-2018-0079560 A 7/2018

* cited by examiner

*Primary Examiner* — Van N Chow
(74) *Attorney, Agent, or Firm* — Innovation Counsel LLP

(57) ABSTRACT

A display apparatus is disclosed that comprises a display panel. The display panel includes a display region that includes a first display area and a second display area. A data driver is configured to provide a data voltage to the display region. A gate driver is configured to provide a compensation gate signal and an initialization gate signal to the display region. The gate driver includes a first stage and a second stage. A driving controller is configured to control the gate driver and the data driver. The driving controller is configured to determine a first driving frequency for the first display area and a second driving frequency for the second display area. The second stage is configured to provide the compensation gate signal having a pulse duration shorter than a pulse duration of the compensation gate signal provided to the display region by the first stage.

20 Claims, 18 Drawing Sheets

DISPLAY APPARATUS AND METHOD OF DRIVING THE SAME

PRIORITY STATEMENT

This application claims priority under 35 U.S.C. § 119 to Korean Patent Application No. 10-2021-0056672, filed on Apr. 30, 2021 in the Korean Intellectual Property Office KIPO, the contents of which are herein incorporated by reference in their entireties.

BACKGROUND

1. Field

The present inventive concept relates to a display apparatus and a method of driving the display apparatus. More particularly, the present inventive concept relates to a display apparatus compensating an output deviation of a display panel and a method of driving the display apparatus.

2. Description of the Related Art

In a display apparatus, a moving image may be displayed on a portion of the display panel and a still image may be displayed on another portion of the display panel. In addition, a portion of the display panel may be driven in a high driving frequency corresponding to the moving image, and another portion of the display panel may be driven in a low driving frequency corresponding to the still image. In this case, a conventional display apparatus may not provide an initialization gate signal and a compensation gate signal to the portion of the display panel driven in a low driving frequency.

In this case, the conventional display apparatus may provide the initialization gate signal and the compensation gate signal which are generated in one stage to different pixel rows. In such a conventional display, a luminance difference may occur at a boundary between a portion driven in the high driving frequency and a portion driven in the low driving frequency.

SUMMARY

Embodiments of the present inventive concept provide a display apparatus reducing a luminance difference between portions of a display panel driven in different driving frequencies and enhancing a display quality.

Embodiments of the present inventive concept also provide a method of driving the display apparatus.

An embodiment of a display apparatus includes a display panel including a display region including a first display area and a second display area, a data driver configured to provide a data voltage to the display region, a gate driver configured to provide a compensation gate signal and an initialization gate signal to the display region. The gate driver includes a first stage and a second stage A driving controller is configured to control the gate driver and the data driver. The driving controller is configured to determine a first driving frequency for the first display area and a second driving frequency for the second display area. The second stage is configured to provide the compensation gate signal having a pulse duration shorter than a pulse duration of the compensation gate signal provided to the display region by the first stage.

In an embodiment, the gate driver may further include a third stage. The first stage may be configured to provide the compensation gate signal synchronized to the first driving frequency and the initialization gate signal synchronized to the first driving frequency to the display region. The second stage may be configured to provide the compensation gate signal synchronized to the first driving frequency and the initialization gate signal synchronized to the second driving frequency to the display region. The third stage may be configured to provide the compensation gate signal synchronized to the second driving frequency and the initialization gate signal synchronized to the second driving frequency to the display region.

In an embodiment, the second stage may be disposed between the first stage and the third stage.

In an embodiment, the first stage may be configured to provide the compensation gate signal and the initialization gate signal to the first display area. The second stage may be configured to provide the compensation gate signal to the first display area and the initialization gate signal to the second display area. The third stage may be configured to provide the compensation gate signal and the initialization gate signal to the second display area.

In an embodiment, the second stage may provide the compensation gate signal having the pulse duration equal to the pulse duration of the compensation gate signal provided to the display region by the first stage in a data writing period. The second stage may provide the compensation gate signal having the pulse duration shorter than the pulse duration of the compensation gate signal provided to the display region by the first stage in a hold period.

In an embodiment, a P-th (P is a positive integer) stage of the gate driver may be configured to provide the compensation gate signal to a Q-th (Q is a positive integer) pixel row of the display region, and to provide the initialization gate signal to a (Q+N)-th (N is a positive integer) pixel row of the display region. The number of the second stages may be N.

In an embodiment, a pixel of the display region may include a driving transistor configured to generate a driving current, a switching transistor configured to transmit the data voltage or a blank voltage to a source of the driving transistor in response to a writing gate signal, a compensation transistor configured to connect the driving transistor in a diode-connection in response to the compensation gate signal, a storage capacitor configured to store a voltage where a threshold voltage of the driving transistor is subtracted from the data voltage, a first initialization transistor configured to provide a first initialization voltage to a gate of the driving transistor and the storage capacitor in response to the initialization gate signal, a first emission transistor configured to connect a line of a pixel power voltage to the source of the driving transistor in response to an emission signal, a second emission transistor configured to connect a drain of the driving transistor to an emission element in response to the emission signal, a second initialization transistor configured to provide a second initialization voltage to the emission element in response to the writing gate signal for pixels of a next pixel row, and the emission element configured to emit light based on the driving current.

In an embodiment, each of stages of the gate driver may include an input part configured to transmit an input signal to a first node in response to a first clock signal, a first stress relieving part disposed between the first node and a second node and configured to transmit a voltage of the first node to the second node, a first transmitting part configured to transmit a first power voltage to a third node in response to the first clock signal, a second stress relieving part disposed between the third node and a fourth node and configured to transmit a voltage of the third node to the fourth node, a first bootstrap part configured to bootstrap the fourth node based on a second clock signal, a maintaining part configured to maintain a voltage of a fifth node, a compensation gate signal output part configured to output a second power voltage as the compensation gate signal in response to the voltage of the fifth node, an initialization gate signal output part configured to output a third power voltage as the initialization gate signal in response to the voltage of the fifth node, a second bootstrap part configured to bootstrap the second node based on the second clock signal, a second transmitting part configured to transmit the first clock signal to the third node in response to the voltage of the first node, and a third transmitting part configured to transmit the second power voltage to the fifth node in response to the voltage of the first node.

In an embodiment, the first power voltage may be a gate off voltage. A second power voltage of the first stage and a third power voltage of the first stage may be a gate on voltage. A second power voltage of the second stage may be the gate on voltage. A third power voltage of the second stage may be the gate on voltage in a data writing period and may be the gate off voltage in a hold period. A second power voltage of the third stage and a third power voltage of the third stage may be the gate on voltage in the data writing period, and may be the gate off voltage in the hold period.

In an embodiment, the driving controller may be configured to shift the first clock signal and the second clock signal to a time advanced by a compensation time, when the input signal is in a pulse off-state in a period in which the compensation gate signal provided to the display region by the second stage is in pulse on-state.

In an embodiment, the compensation time may be determined based on a difference between a voltage value of the compensation gate signal provided to the display region by the first stage during a change from the pulse on-state to the pulse off-state and a voltage value of the compensation gate signal provided to the display region by the second stage during the change from the pulse on-state to the pulse off-state, when the first clock signal equal to the first clock signal provided to the first stage and the second clock signal equal to the second clock signal provided to the first stage are provided to the second stage in the hold period.

In an embodiment, the compensation time may increase as the difference increases.

In embodiments of display apparatus according to the present inventive concept, the display apparatus includes a display panel including a display region including a first display area and a second display area, a data driver configured to provide a data voltage to the display panel, a gate driver configured to provide a compensation gate signal and an initialization gate signal to the display region, and including a first stage and a second stage, and a driving controller configured to control the gate driver and the data driver. The driving controller is configured to determine a normal driving frequency for the display region in a normal mode, a first driving frequency for the first display area in a multi frequency mode, and a second driving frequency for the second display area in the multi frequency mode. The second stage is configured to provide the compensation gate signal having a pulse duration shorter than a pulse duration of the compensation gate signal provided to the display region by the first stage in the multi frequency mode.

In an embodiment, the first stage may be configured to provide the compensation gate signal synchronized to the first driving frequency and the initialization gate signal synchronized to the first driving frequency to the display region in the multi frequency mode, and provide the compensation gate signal synchronized to the normal driving frequency and the initialization gate signal synchronized to the normal driving frequency to the display region in the normal mode. The second stage may be configured to provide the compensation gate signal synchronized to the first driving frequency and the initialization gate signal synchronized to the second driving frequency to the display region in the multi frequency mode, and provide the compensation gate signal synchronized to the normal driving frequency and the initialization gate signal synchronized to the normal driving frequency to the display region in the normal mode.

In an embodiment, the gate driver further may include a third stage. The third stage may be configured to provide the compensation gate signal synchronized to the second driving frequency and the initialization gate signal synchronized to the second driving frequency to the display region in the multi frequency mode, and provide the compensation gate signal synchronized to the normal driving frequency and the initialization gate signal synchronized to the normal driving frequency to the display region in the normal mode.

In an embodiment, each of stages of the gate driver may include an input part configured to transmit an input signal to a first node in response to a first clock signal, a first stress relieving part disposed between the first node and a second node and configured to transmit a voltage of the first node to the second node, a first transmitting part configured to transmit a first power voltage to a third node in response to the first clock signal, a second stress relieving part disposed between the third node and a fourth node and configured to transmit a voltage of the third node to the fourth node, a first bootstrap part configured to bootstrap the fourth node based on a second clock signal, a maintaining part configured to maintain a voltage of a fifth node, a compensation gate signal output part configured to output a second power voltage as the compensation gate signal in response to the voltage of the fifth node, an initialization gate signal output part configured to output a third power voltage as the initialization gate signal in response to the voltage of the fifth node, a second bootstrap part configured to bootstrap the second node based on the second clock signal, a second transmitting part configured to transmit the first clock signal to the third node in response to the voltage of the first node, and a third transmitting part configured to transmit the second power voltage to the fifth node in response to the voltage of the first node.

In an embodiment, in the normal mode, a first power voltage of the first stage, the second stage and the third stage may be a gate off voltage. A second power voltage of the first stage, the second stage and the third stage and a third power voltage of the first stage, the second stage and the third stage may be a gate on voltage. In the multi frequency mode, the second power voltage of the first stage and the third power voltage of the first stage may be the gate on voltage. In the multi frequency mode, the second power voltage of the second stage is the gate on voltage. In the multi frequency mode, the third power voltage of the second stage may be the gate on voltage in a data writing period and may be the gate off voltage in a hold period. In the multi frequency mode, the second power voltage of the third stage and the third power voltage of the third stage may be the gate on voltage in the data writing period and may be the gate off voltage in the hold period.

In an embodiment, in the multi frequency mode, the driving controller may be configured to shift the first clock signal and the second clock signal to a time advanced by a compensation time, when the input signal is in a pulse off-state in a period in which the compensation gate signal provided to the display region by the second stage is in pulse on-state.

An embodiment of a method of driving the display apparatus includes determining a driving mode of display apparatus as a multi frequency mode when an input image data includes a still image, determining a driving mode of display apparatus as a normal mode when the input image data does not include the still image, providing a clock signal to a plurality of stages including a first stage, a second stage, and a third stage, generating an initialization gate signal and a compensation gate signal based on the clock signal and an input signal in the stages, and shifting, in the multi frequency mode, the clock signal to a time advanced by a compensation time, when the input signal is in a pulse off-state in a period in which the compensation gate signal generated in the second stage disposed between the first stage and the second stage is in pulse on-state.

In an embodiment, the shifting the clock signal may be performed in a hold period of the multi frequency mode.

The display apparatus and the method of driving the display apparatus according to embodiments may generate a compensation gate signal and an initialization gate signal from a same stage and may reduce a bezel of the display panel.

In addition, the display apparatus and the method of driving the display apparatus according to embodiments may reduce a luminance difference between two adjacent display portions by adjusting the compensation gate signal provided to an area where the two adjacent display portions meet.

The display apparatus and the method of driving the display apparatus according to embodiments may provide the compensation gate signal having a relatively short pulse duration to the area where the two adjacent display portions meet and the luminance difference may be reduced by lowering a voltage at a gate electrode of a driving transistor.

The display apparatus and the method of driving the display apparatus according to some embodiments may shift a clock signal provided to a stage providing the compensation gate signal and the initialization gate signal to the area where the two adjacent display portions meet to a time advanced by a compensation time so that the pulse duration of the compensation gate signal may be reduced.

However, the effects of the present inventive concept are not limited to the above-described effects, and may be variously expanded without departing from the spirit and scope of the present inventive concept.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION

Hereinafter, embodiments of the present inventive concept will be explained in detail with reference to the accompanying drawings.

Figure 1:
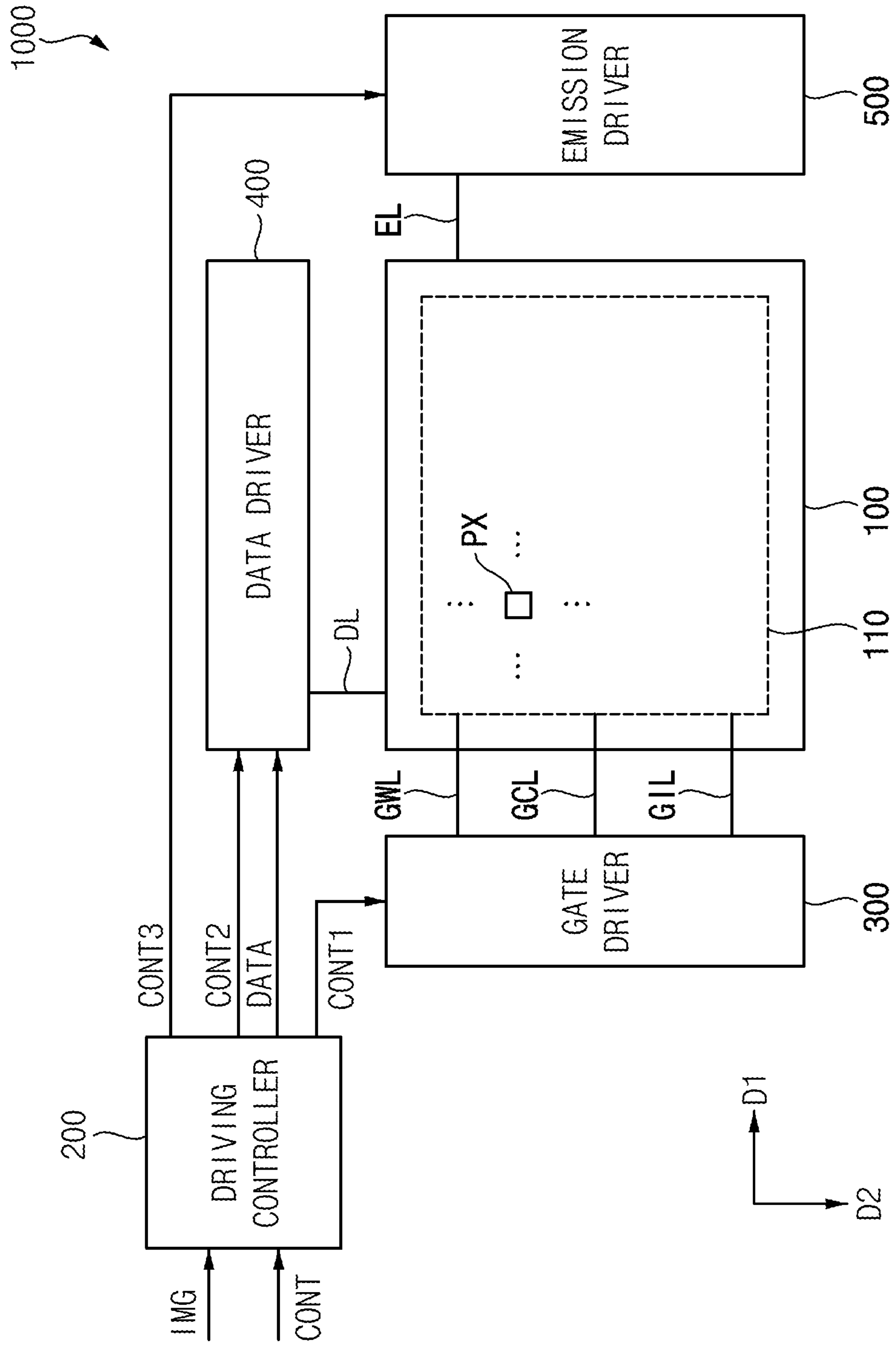
FIG. 1 is a block diagram illustrating a display apparatus according to embodiments of the present inventive concept.

FIG. 1 is a block diagram illustrating a display apparatus 1000 according to embodiments of the present inventive concept.

Referring to FIG. 1, the display apparatus 1000 may include a display panel 100 and a display panel driver. The display panel driver may include a driving controller 200, a gate driver 300, a data driver 400, and an emission driver 500.

The display panel 100 may include a display region 110 on which an image is displayed and a peripheral region adjacent to the display region 110.

The display region 110 may include an initialization gate line GIL, a compensation gate line GCL, a writing gate line GWL, a data line DL, an emission line EL, and a plurality of pixels PX electrically connected to the initialization gate line GIL, the compensation gate line GCL, the writing gate line GWL, the data line DL, and the emission line EL. The gate lines GIL, GCL, and GWL may extend in a first direction D1 and the data line DL may extend in a second direction D2 crossing the first direction D1. The emission line EL may extend in the first direction D1.

The driving controller 200 may receive an input image data IMG and an input control signal CONT from a host processor (e.g. a graphic processing unit; GPU). For example, the input image data IMG may include red image data, green image data and blue image data. According to an embodiment, the input image data IMG may further include white image data. For another example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a clock signal.

The driving controller 200 may generate the second control signal CONT2 for controlling an operation of the data driver 400 based on the input control signal CONT, and output the second control signal CONT2 to the data driver 400. The second control signal CONT2 may include a horizontal start signal and a load signal.

The driving controller 200 may generate the data signal DATA based on the input image data IMG. The driving controller 200 may output the data signal DATA to the data driver 400.

The driving controller 200 may generate the third control signal CONT3 based on the input control signal CONT. The driving controller 200 may output the third control signal CONT3 to the emission driver 500.

The gate driver 300 may generate gate signals driving the gate lines GWL, GCL, and GIL in response to the first control signal CONT1 received from the driving controller 200. The gate driver 300 may output the gate signals to the display region 110 through the gate lines GWL, GCL, and GIL. For example, the gate driver 300 may sequentially output the gate signals to the display region 110 through the gate lines GWL, GCL, and GIL. According to an embodiment, the gate driver 300 may be mounted or integrated on the peripheral region of the display panel 100.

The data driver 400 may receive the second control signal CONT2 and the data signal DATA from the driving controller 200. The data driver 400 may convert the data signal DATA into a data voltage having an analog type. The data driver 400 may output the data voltage to the display region 110 through the data lines DL.

The emission driver 500 may generate emission signals driving the emission lines EL in response to the third control signal CONT3 received from the driving controller 200. The emission driver 500 may output the emission signals to the display region 110 through the emission lines EL. For example, the emission driver 500 may sequentially output the emission signals to the emission lines EL.

In FIG. 1, for convenience of explanation, the gate driver 300 is disposed on a first side of the display panel 100, and the emission driver 500 is disposed on a second side opposite to the first side of the display panel 100. However, the present inventive concept is not limited thereto.

Figure 2:
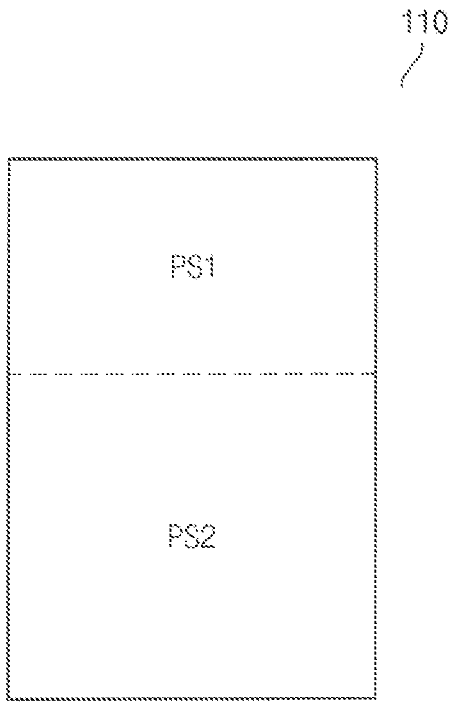
FIG. 2 is a diagram illustrating an example in which a display region of a display panel of FIG. 1 is divided into a first display area and a second display area.

FIG. 2 is a diagram illustrating an example in which a display region 110 of a display panel 100 of FIG. 1 is divided into a first display area PS1 and a second display area PS2.

Referring to FIG. 2, the display region 110 may include a first display area PS1 and a second display area PS2. According to an embodiment, the driving controller 200 may determine a first driving frequency DF1 (FIG. 4) for the first display area PS1 and a second driving frequency DF2 (FIG. 4) for the second display area PS2. For example, when a moving image is displayed on the first display area PS1 and a still image is displayed on the second display area PS2, the driving controller 200 may determine the first driving frequency DF1 for the first display area PS1 and the second driving frequency DF2 which is smaller than the first driving frequency DF1 for the second display area PS2.

Figure 3:
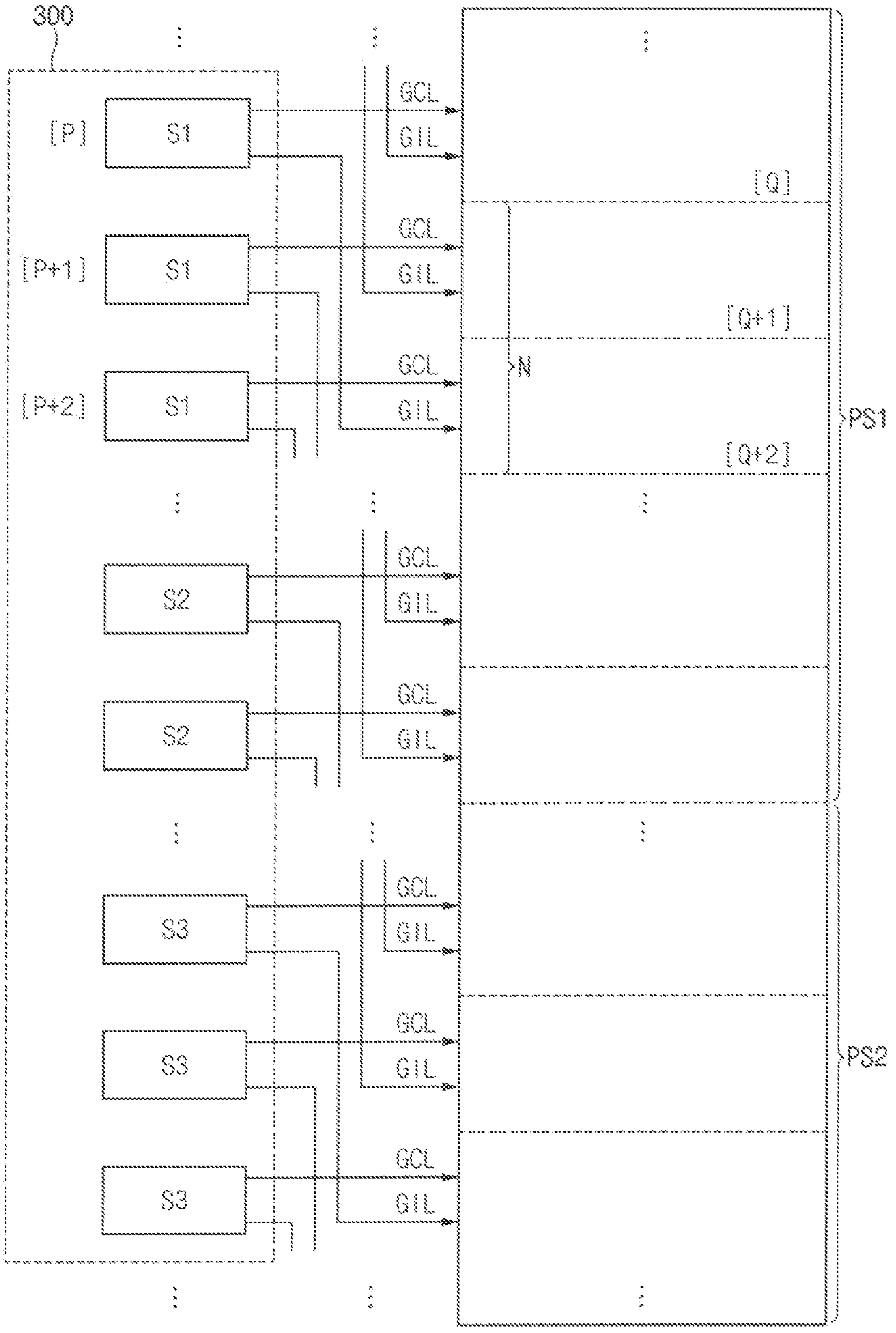
FIG. 3 is a block diagram illustrating an example in which stages of a gate driver of FIG. 1 provide an initialization gate signal and a compensation gate signal to the display region.
Figure 4:
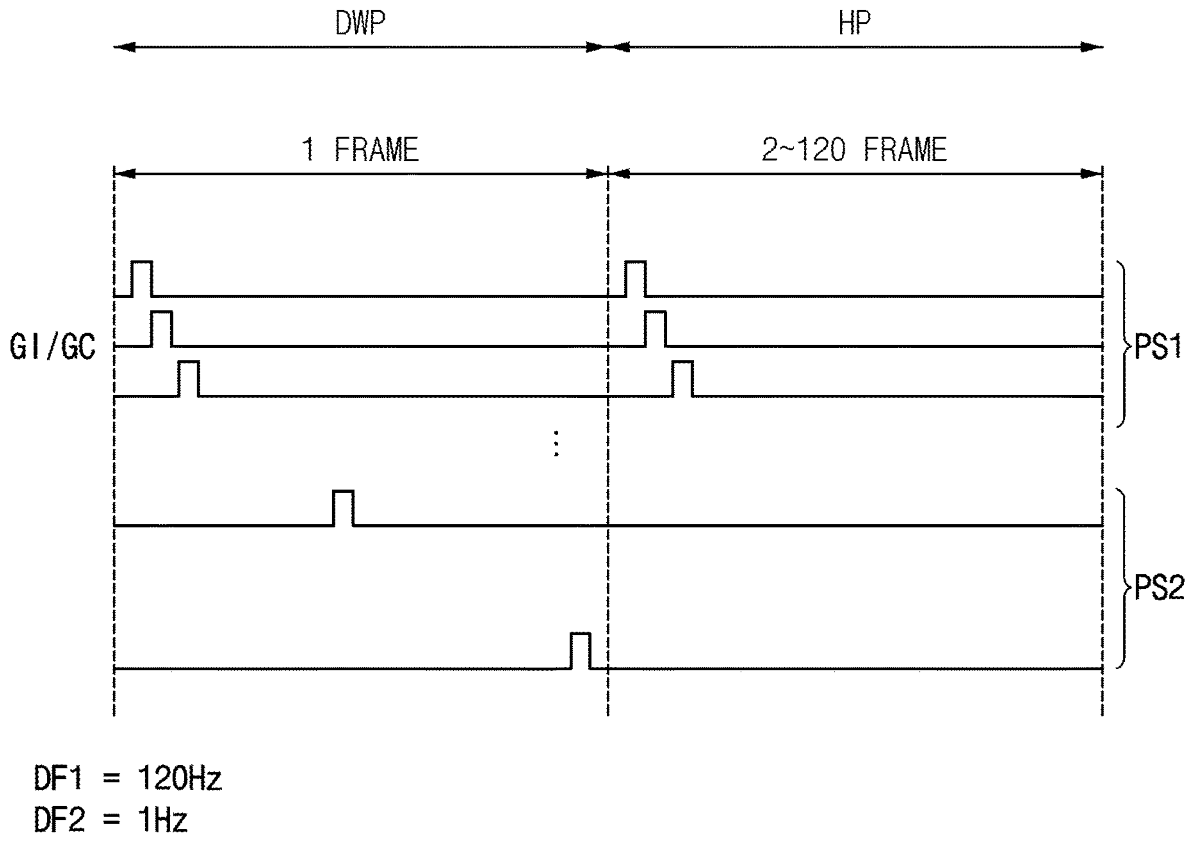
FIG. 4 is a diagram illustrating an example in which the gate driver of FIG. 1 provides the initialization gate signal and the compensation gate signal to the display region in a data writing period and a hold period.

FIG. 3 is a block diagram illustrating an example in which stages of the gate driver 300 of FIG. 1 provide an initialization gate signal GI and a compensation gate signal GC to the display region 110. FIG. 4 is a diagram illustrating an example in which the gate driver 300 of FIG. 1 provides the initialization gate signal GI and the compensation gate signal GC to the display region 110 in a data writing period DWP and a hold period HP. FIG. 4 is a diagram illustrating timings of the initialization gate signal GI and the compensation gate signal GC, and does not represent the extent to which the pulse on-states of the initialization gate signal GI and the compensation gate signal GC are maintained.

Referring to FIGS. 3 and 4, the gate driver 300 may provide the compensation gate signal GC and the initialization gate signal GI to the display region 110. The gate driver 300 may include a first stage S1 and a second stage S2. The gate driver 300 may further include a third stage S3. The first stage S1 may provide the compensation gate signal GC synchronized to the first driving frequency DF1 and the initialization gate signal GI synchronized to the first driving frequency DF1 to the display region 110. The second stage S2 may provide the compensation gate signal GC synchronized to the first driving frequency DF1 and the initialization gate signal GI synchronized to the second driving frequency DF2 to the display region 110. The third stage S3 may provide the compensation gate signal GC synchronized to the second driving frequency DF2 and the initialization gate signal GI synchronized to the second driving frequency DF2 to the display region 110. Accordingly, due to a difference between a synchronized frequency of the compensation gate signal GC and a synchronized frequency of the initialization gate signal GI, the second stage S2 may provide the compensation gate signal GC and not provide the initialization gate signal GI in a specific frame. The second stage S2 may be disposed between the first stage S1 and the third stage S3. The first stage S1 may provide the compensation gate signal GC and the initialization gate signal GI to the first display area PS1. The second stage S2 may provide the compensation gate signal GC to the first display area PS1 and provide the initialization gate signal GI to the second display area PS2. The third stage S3 may provide the compensation gate signal GC and the initialization gate signal GI to the second display area PS2.

Figure 8:
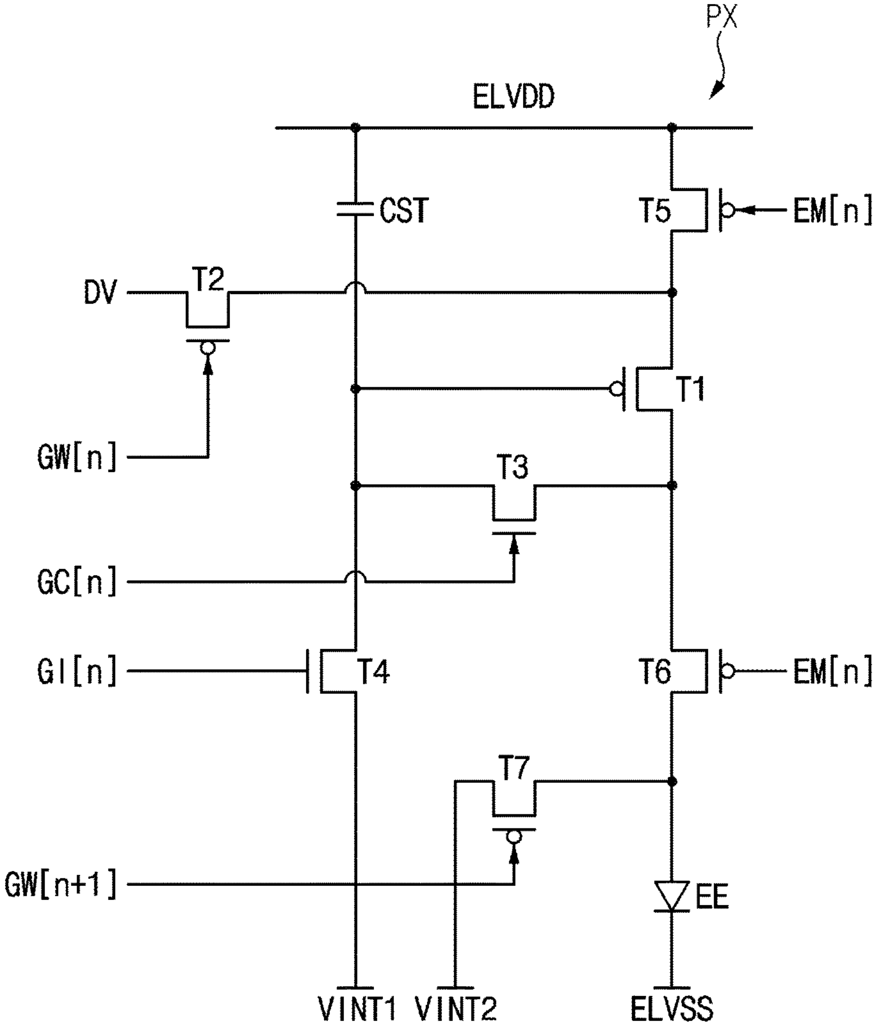
FIG. 8 is a circuit diagram illustrating an example of a pixel of the display apparatus of FIG. 1.

A P-th (P is a positive integer) stage of the gate driver 300 may provide the compensation gate signal GC to a Q-th (Q is a positive integer) pixel row of the display region 110, and provide the initialization gate signal GI to a (Q+N)-th (N is a positive integer) pixel row of the display region 110. The number of the second stages may be N. The pixel row may mean pixels PX sharing the same gate lines GWL, GIL, and GCL. For example, assuming that N is 2, the P-th stage may provide the compensation gate signal GC to the Q-th pixel row, and the P-th stage may provide the initialization gate signal GI to the (Q+2)-th pixel row. The gate driver 300 may include N dummy stages on top of the first stage S1. The dummy stages may provide the compensation gate signal GC to the display region 110 and not provide the initialization gate signal GI to the display region 110. Because the dummy stage provides the compensation gate signal GC to the display region 110, a voltage obtained by subtracting a threshold voltage of a driving transistor T1 from a data voltage DV may be stored in the storage capacitor CST (FIG. 8). A detailed description thereof will be given later.

In the data writing period DWP, the data driver 400 may provide the data voltage DV to the display region 110 through the data lines DL, and the gate driver 300 provide gate signals GC, GW, and GI (FIG. 8) to the display region 110 through the gate lines GCL, GWL, and GIL. When the second driving frequency DF2 is smaller than the first driving frequency DF1, in the hold period HP, the data driver 400 may provide the data voltage DV through the data lines DL to the first display area PS1 and the gate driver 300 may provide the gate signals GC, GW, and GI to the first display area PS1 through the gate lines GCL, GWL, and GIL. When the second driving frequency DF2 is smaller than the first driving frequency DF1, in the hold period HP, the data driver 400 may provide a blank voltage to the second display area PS2 through the data lines DL, and the gate driver 300 may not provide the compensation gate signal GC and the initialization gate signal GI to the second display area PS2 through the gate lines GCL, GWL, and GIL. The blank voltage may have a voltage level of the data voltage DV corresponding to a black grayscale value (e.g. a lowest grayscale value of 0). Since the second stage S2 may provide the initialization gate signal GI synchronized to the second driving frequency DF2 to the display region 110 and may provide the compensation gate signal GC synchronized to the first driving frequency DF1 to the display region 110, when the second driving frequency DF2 is smaller than the first driving frequency DF1, the initialization gate signal GI may not be provided to the display region 110 in the hold period HP and the compensation gate signal GC may be provided to the display region 110. For convenience of explanation, in FIG. 4, it is assumed that the first driving frequency DF1 is 120 Hz and the second driving frequency DF2 is 1 Hz. For example, the data writing period DWP may include one frame, and the first display area PS1 and the second display area PS2 may receive the gate signals GC, GW, and GI in the data writing period DWP. For example, the hold period HP may include 119 frames (2 to 120 Frames), and the second display area PS2 may not receive the initialization gate signal GI and the compensation gate signal GC in the hold period HP. In this case, the second display area PS2 may be driven in a different frequency from a frequency of the first display area PS1.

Figure 5:
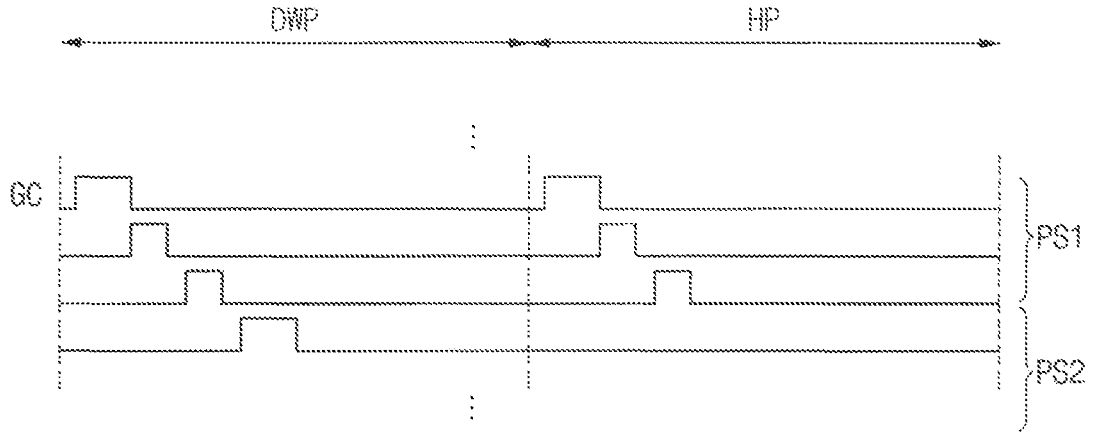
FIG. 5 is a diagram illustrating an example in which the gate driver of FIG. 1 provides the compensation gate signal to the display region in the data writing period and the hold period.
Figure 6:
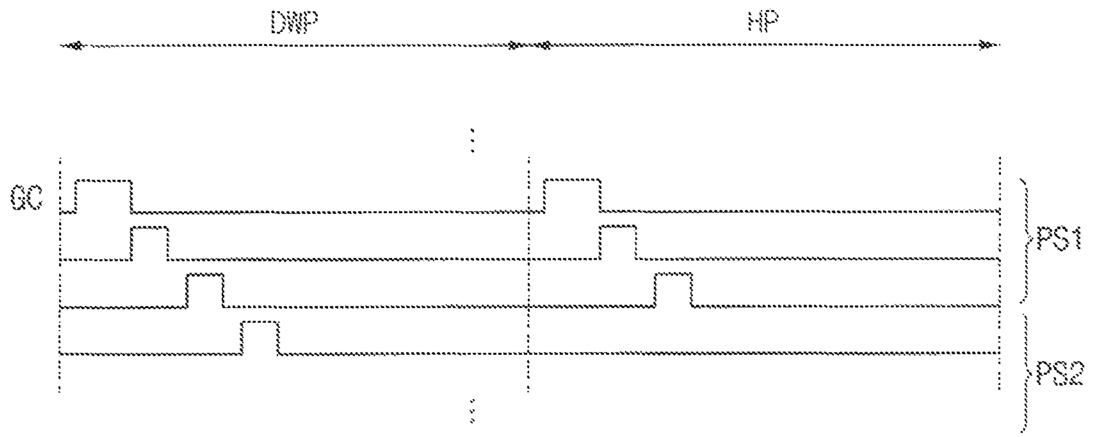
FIG. 6 is a diagram illustrating an example in which a gate driver according to an embodiment provides a compensation gate signal to a display region in a data writing period and a hold period.
Figure 7:
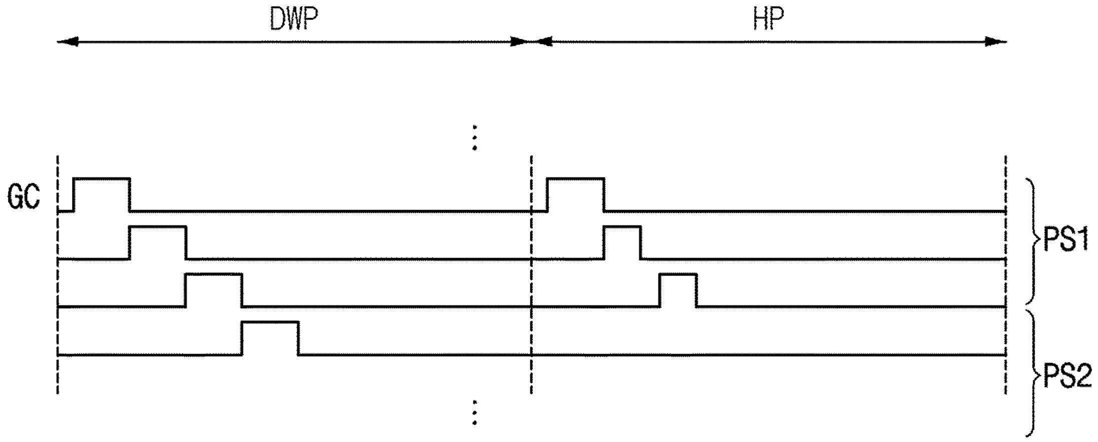
FIG. 7 is a diagram illustrating an example in which a gate driver according to an embodiment provides a compensation gate signal to a display region in a data writing period and a hold period.

FIG. 5 is a diagram illustrating an example in which the gate driver 300 of FIG. 1 provides the compensation gate signal GC to the display region 110 in the data writing period DWP and the hold period HP. FIGS. 6 to 7 are diagrams illustrating an example in which a gate driver 300 according to an embodiment provides the compensation gate signal GC to the display region 110 in the data writing period DWP and the hold period HP. In FIGS. 5 to 7, a first compensation gate signal GC is the compensation gate signal GC provided to the display region 110 in the first stage S1, and a second compensation signal and a third compensation gate signal GC are the compensation gate signal GC provided to the display region 110 in the second stage S2, and a fourth compensation gate signal GC is the compensation gate signal GC provided to the display region 110 in the third stage S3. That is, in FIGS. 5 to 7, the first, second, and third compensation gate signals GC are provided to the first display region PS1, and the fourth compensation gate signal GC is provided to the second display region PS2.

Referring to FIGS. 3 and 5, the second stage S2 may provide the compensation gate signal GC having a pulse duration shorter than a pulse duration of the compensation gate signal GC provided to the display region 110 by the first stage S1. For example, as shown in FIG. 5, the pulse duration of the second and third compensation gate signals GC of FIG. 5 is shorter than pulse duration of the other compensation gate signals GC of FIG. 5.

Referring to FIGS. 3 and 6, the pulse duration of the compensation gate signals GC provided to the display region 110 by the second stage S2 and the third stage S3 may be shorter than the pulse duration of the compensation gate signal GC provided to the display region 110 by the first stage S1. For example, as shown in FIG. 6, pulse duration of the second, third, and fourth compensation gate signals GC are shorter than pulse duration of the first compensation gate signal GC.

Referring to FIGS. 3 and 7, in the data writing period DWP, the second stage S2 may provide the compensation gate signal GC having the pulse duration equal to the pulse duration of the compensation gate signal GC provided to the display region 110 by the first stage S1 in the data writing period DWP. The second stage S2 may provide the compensation gate signal GC having the pulse duration shorter than the pulse duration of the compensation gate signal GC provided to the display region 110 by the first stage S1 in the hold period HP. In the data writing period DWP, the first stage S1, the second stage S2, and the third stage S3 may provide the compensation gate signal GC and the initialization gate signal GI to the display region 110. Thus, the pulse duration of the compensation gate signal GC may be constant. In the hold period HP, the second stage S2 may provide the compensation gate signal GC to the display region 110 and may not provide the initialization gate signal GI to the display region 110. Accordingly, in the hold period HP, the pulse duration of the compensation gate signal GC provided by the second stage S2 may be short. A detailed description thereof will be given later.

FIG. 8 is a circuit diagram illustrating an example of the pixel PX of the display apparatus 1000 of FIG. 1.

Referring to FIG. 8, the pixel PX of the display region 110 may include a driving transistor T1 that generates a driving current. The pixel PX of the display region 110 may include a switching transistor T2 that transfers the data voltage DV or the blank voltage to a source of the driving transistor T1 in response to the writing gate signal GW[n]. The pixel PX of the display region 110 may include a compensation transistor T3 that connects the driving transistor T1 in a diode-connection in response to the gate compensation signal GC[n]. The pixel PX of the display region 110 may include a storage capacitor CST that stores a voltage where a threshold voltage of the driving transistor T1 is subtracted from the data voltage DV. The pixel PX of the display region 110 may include a first initialization transistor T4 that provides a first initialization voltage VINT1 to the storage capacitor CST and a gate of the driving transistor T1 in response to the initialization gate signal GI[n]. The pixel PX of the display region 110 may include a first emission transistor T5 that connects a line of a first pixel power voltage ELVDD to the source of the driving transistor T1 in response to an emission signal EM[n]. The pixel PX of the display region 110 may include a second emission transistor T6 that connects a drain of the driving transistor T1 to an emission element EE in response to the emission signal EM[n]. The pixel PX of the display region 110 may include a second initialization transistor T7 that provides a second initialization voltage VINT2 to the emission element EE in response to the writing gate signal GW[n+1] for the pixels PX of a next pixel row. The pixel PX of the display region 110 may include the emission element EE that emits light based on the driving current. According to embodiments, the first initialization voltage VINT1 and the second initialization voltage VINT2 may be substantially the same voltages, or may be different voltages. In an embodiment, at least a first one of the driving transistor T1, the switching transistor T2, the compensation transistor T3, the first initialization transistor T4, the first emission transistor T5, the second emission transistor T6 and the second initialization transistor T7 may be a PMOS transistor, and at least a second one of the driving transistor T1, the switching transistor T2, the compensation transistor T3, the first initialization transistor T4, the first emission transistor T5, the second emission transistor T6 and the second initialization transistor T7 may be an NMOS transistor. For example, as illustrated in FIG. 8, the compensation transistor T3 and the first initialization transistor T4 may be the NMOS transistors, and other transistors T1, T2, T5, T6 and T7 may be the PMOS transistors. In this case, the gate compensation signal GC[n] provided to the compensation transistor T3 and the initialization gate signal GI[n] provided to the first initialization transistor T4 may be active high signals suitable for the NMOS transistors. In this case, since the compensation and first initialization transistors T3 and T4 directly connected to the storage capacitor CST are the NMOS transistors, leakage currents from/to the storage capacitor CST may be reduced, and thus the pixel PX may be suitable for the low frequency driving. Although FIG. 8 illustrates an example where the compensation transistor T3 and the first initialization transistor T4 are the NMOS transistors, a configuration of each pixel PX according to embodiments is not limited to the example of FIG. 8. Also, although the data voltage DV is provided to the switching transistor T2 in FIG. 8, in the hold period HP, the blank voltage, not the data voltage DV, is provided to the switching transistor T2 in the second display area S2. A voltage provided to the gate of the driving transistor T1 may increase as the compensation gate signal GC provided to the gate, when the compensation transistor T3 is the NMOS transistor. Accordingly, the driving currents of pixels PX receiving different compensation gate signals GC may be different even when the same data voltage is provided.

Figure 9:
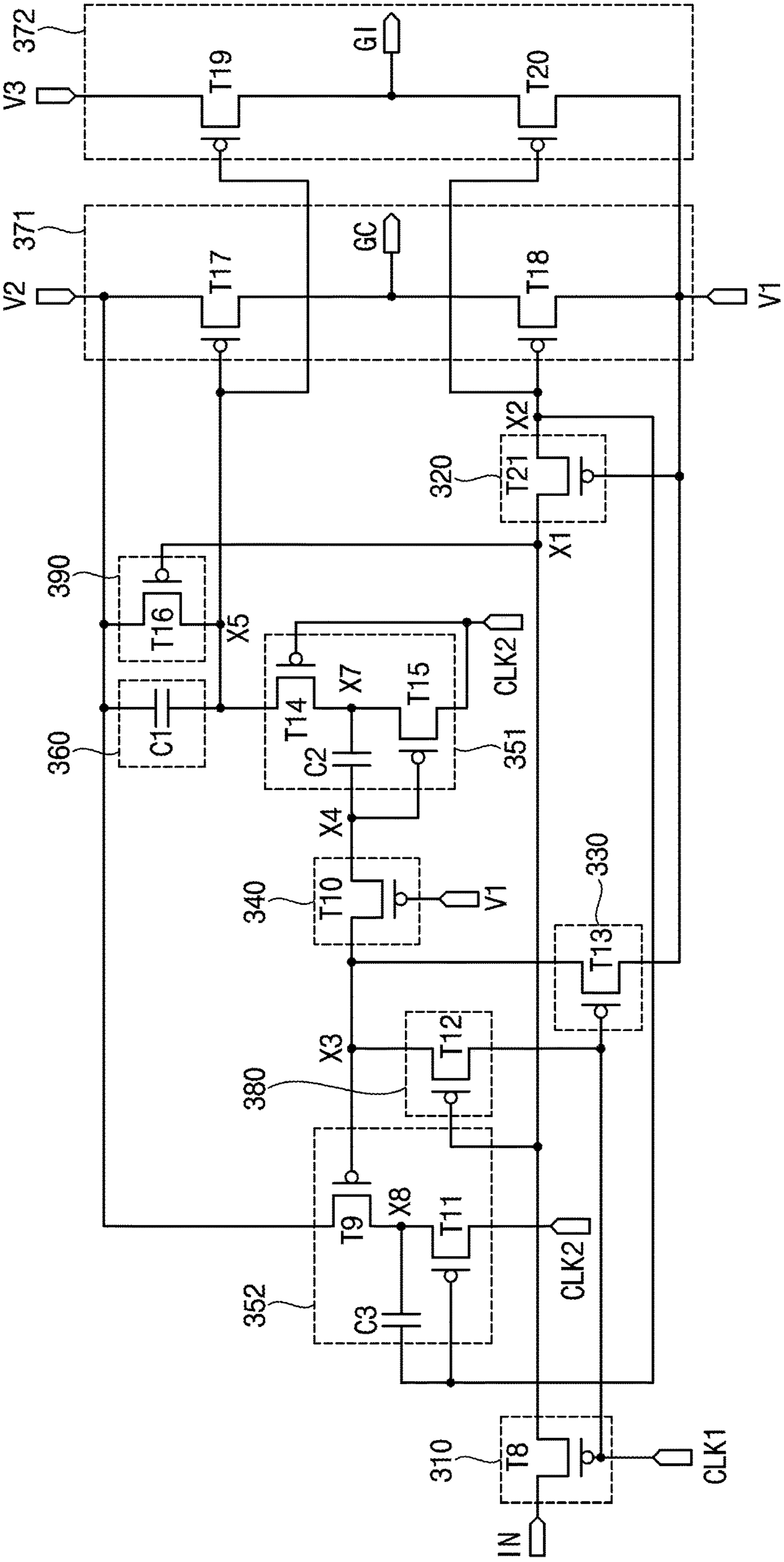
FIG. 9 is a circuit diagram illustrating an example of a stage of the gate driver of FIG. 1.

FIG. 9 is a circuit diagram illustrating an example of a stage of the gate driver 300 of FIG. 1.

Referring to FIG. 9, each of stages of the gate driver 300 may include an input part 310 that transmits an input signal IN to a first node X1 in response to a first clock signal CLK1. Each of the stages of the gate driver 300 may include a first stress relieving part 320 disposed between the first node X1 and a second node X2 that transmits a voltage of the first node X1 to the second node X2. Each of the stages of the gate driver 300 may include a first transmitting part 330 that transmits a first power voltage V1 to a third node X3 in response to the first clock signal CLK1. Each of the stages of the gate driver 300 may include a second stress relieving part 340 disposed between the third node X3 and a fourth node X4 that transmits a voltage of the third node X3 to the fourth node X4. Each of the stages of the gate driver 300 may include a first bootstrap part 351 that bootstraps the fourth node X4 based on a second clock signal CLK2. Each of the stages of the gate driver 300 may include a maintaining part 360 that maintains a voltage of a fifth node X5. Each of the stages of the gate driver 300 may include a compensation gate signal output part 371 that outputs a second power voltage V2 as the compensation gate signal GC in response to the voltage of the fifth node X5. Each of the stages of the gate driver 300 may include an initialization gate signal output part 372 that outputs a third power voltage V3 as the initialization gate signal GI in response to the voltage of the fifth node X5. Each of the stages of the gate driver 300 may include a second bootstrap part 352 that bootstraps the second node X2 based on the second clock signal CLK2. Each of the stages of the gate driver 300 may include a second transmitting part 380 that transmits the first clock signal CLK1 to the third node X3 in response to the voltage of the first node X1. Each of the stages of the gate driver 300 may include a third transmitting part 390 that transmits the second power voltage V2 to the fifth node X5 in response to the voltage of the first node X1. A first stage among the stages of the gate driver 300 may receive a scan start signal as the input signal IN, and may output a carry signal based on the scan start signal. Stages except for the first stage may receive the carry signal as the input signal IN.

In an embodiment, the input part 310 may include an eighth transistor T8 including a gate receiving the first clock signal CLK1, a first terminal receiving the input signal IN, and a second terminal connected to the first node X1. In an embodiment, the first stress relieving part 320 may include a twenty first transistor T21 including a gate receiving the first power voltage V1, a first terminal connected to the first node X1, and a second terminal connected to the second node X2. In an embodiment, the first transmitting part 330 may include a thirteenth transistor T13 including a gate receiving the first clock signal CLK1, a first terminal connected to the first power voltage V1, and a second terminal connected to the third node X3. In an embodiment, the second stress relieving part 340 may include a tenth transistor T10 including a gate receiving the first power voltage V1, a first terminal connected to the third node X3, and a second terminal connected to the fourth node X4. In an embodiment, the first bootstrap part 351 may include a fifteenth transistor T15 including a gate connected to the fourth node X4, a first terminal connected to the second clock signal CLK2, and a second terminal connected to a seventh node X7, a second capacitor C2 connected to the fourth node X4 and the seventh node X7, and a fourteenth transistor T14 including a gate receiving the second clock signal CLK2, a first terminal connected to the seventh node X7, and a second terminal connected to the fifth node X5. In an embodiment, the second bootstrap part 352 may include an eleventh transistor T11 including a gate connected to the second node X2, a first terminal connected to the second clock signal CLK2, and a second terminal connected to an eighth node X8, a third capacitor C3 connected to the second node X2 and the eighth node X8 and a ninth transistor T9 including a gate connected to the third node, a first terminal connected to the eighth node X8, and a second terminal receiving the second power voltage V2. In an embodiment, the maintaining part 360 may include a first capacitor C1 connected to the fifth node X5 and the second power voltage V2. In an embodiment, the compensation gate signal output part 371 may include a seventeenth transistor T17 including a gate connected to the fifth node X5, a first terminal receiving the second power voltage V2, and a second terminal connected to a compensation gate signal output terminal, and an eighteenth transistor T18 including a gate connected to the second node X2, a first terminal receiving the first power voltage V1, and a second terminal connected to the compensation gate signal output terminal. In an embodiment, the initialization gate signal output part 372 may include a nineteenth transistor T19 including a gate connected to the fifth node X5, a first terminal receiving the third power voltage V3, and a second terminal connected to an initialization gate signal output terminal, and a twentieth transistor T20 including a gate connected to the second node X2, a first terminal receiving the first power voltage V1, and a second terminal connected to the initialization gate signal output terminal. In an embodiment, the second transmitting part 380 may include a twelfth transistor T12 including a gate connected to the first node X1, a first terminal connected to the first clock signal CLK1, and a second terminal connected to the third node X3. Also, in an embodiment, the twelfth transistor T12 may be implemented as a dual transistor including two transistors connected in series. In an embodiment, the third transmitting part 390 may include a sixth transistor T16 including a gate connected to the first node X1, a first terminal connected to the fifth node X5, and a second terminal receiving the second power voltage V2.

Figure 10:
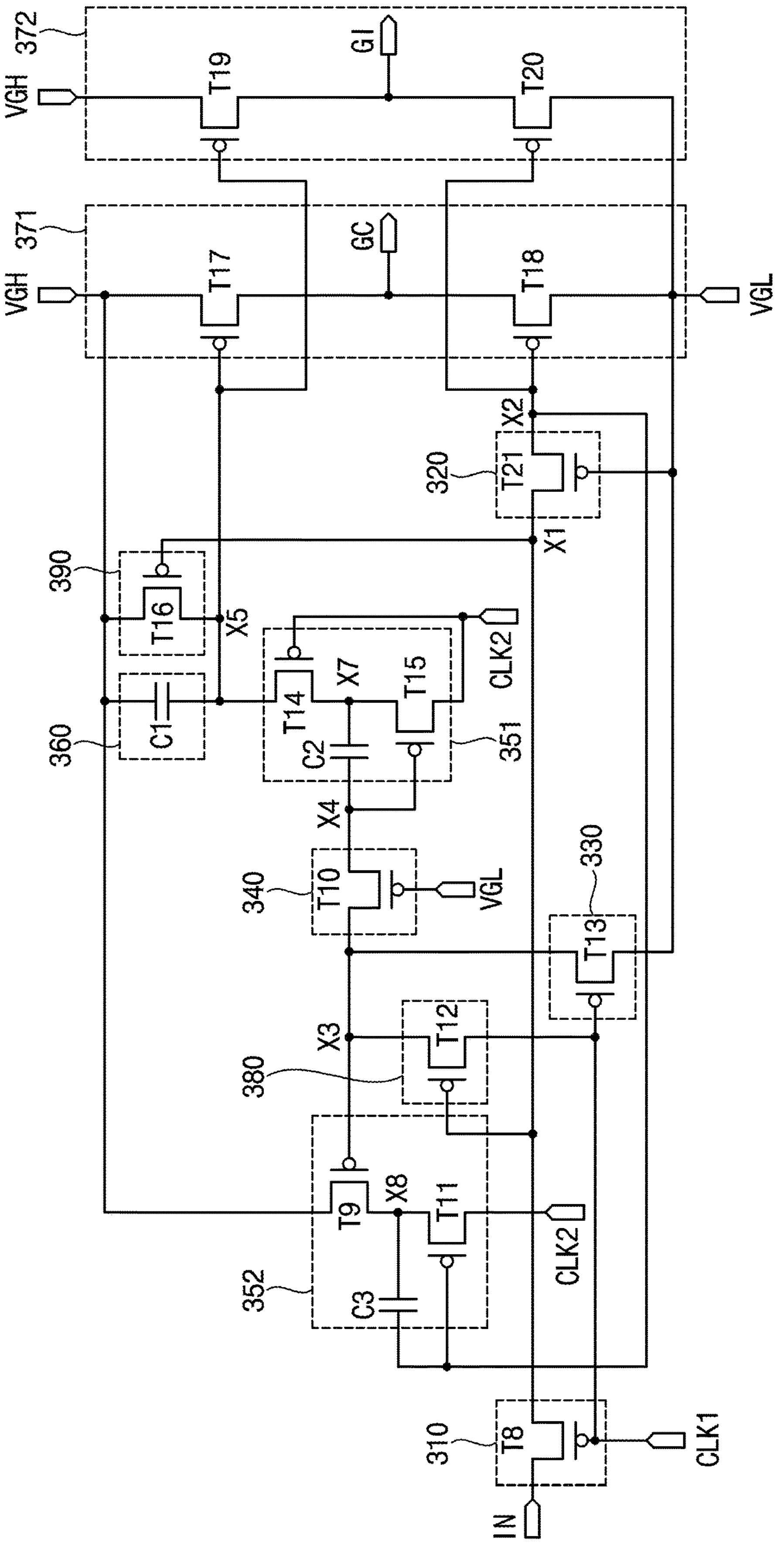
FIG. 10 is a circuit diagram illustrating an example of a stage of the gate driver of FIG. 1.
Figure 11:
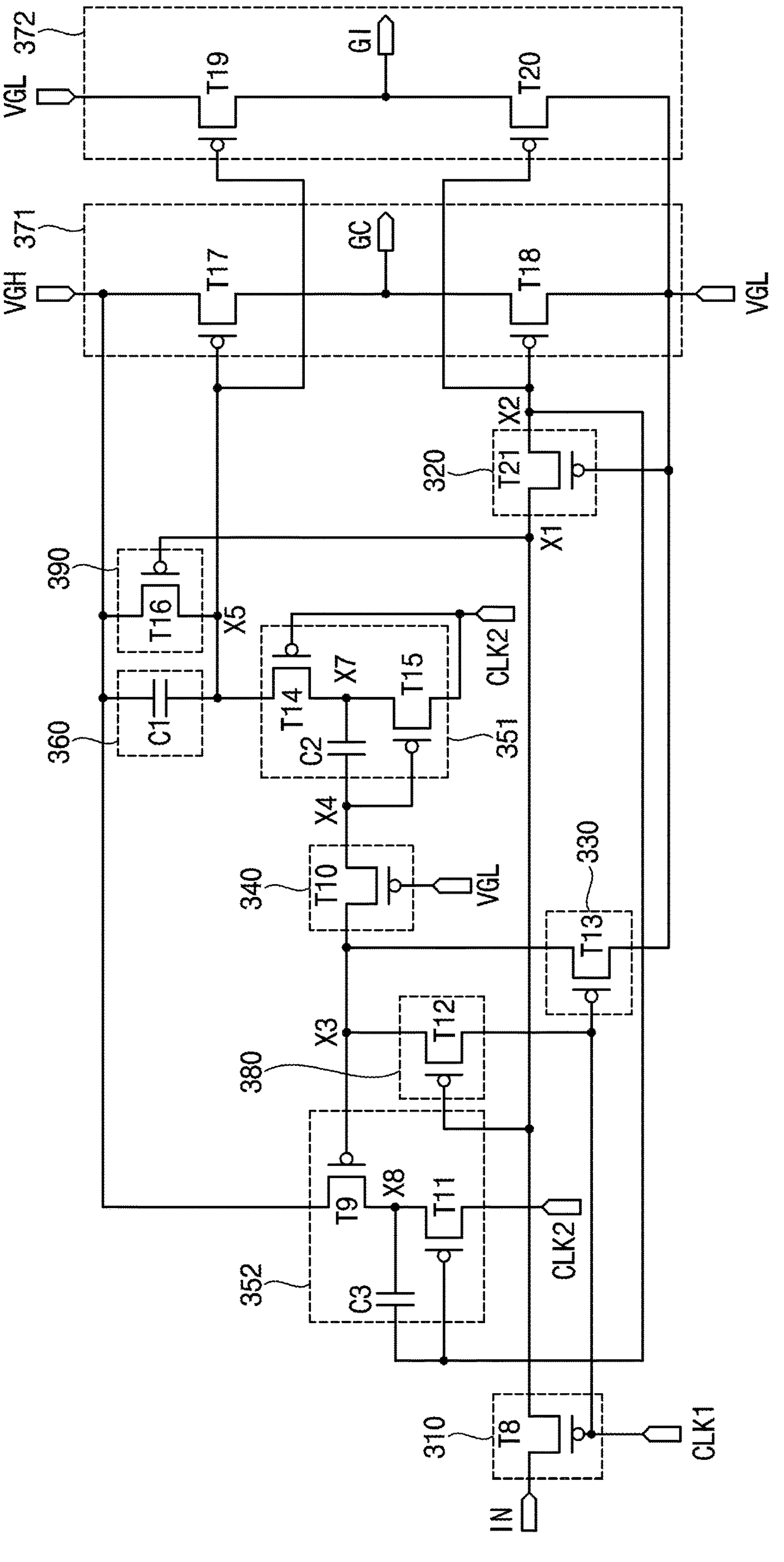
FIG. 11 is a circuit diagram illustrating an example of a second stage of the gate driver of FIG. 1 in the hold period.
Figure 12:
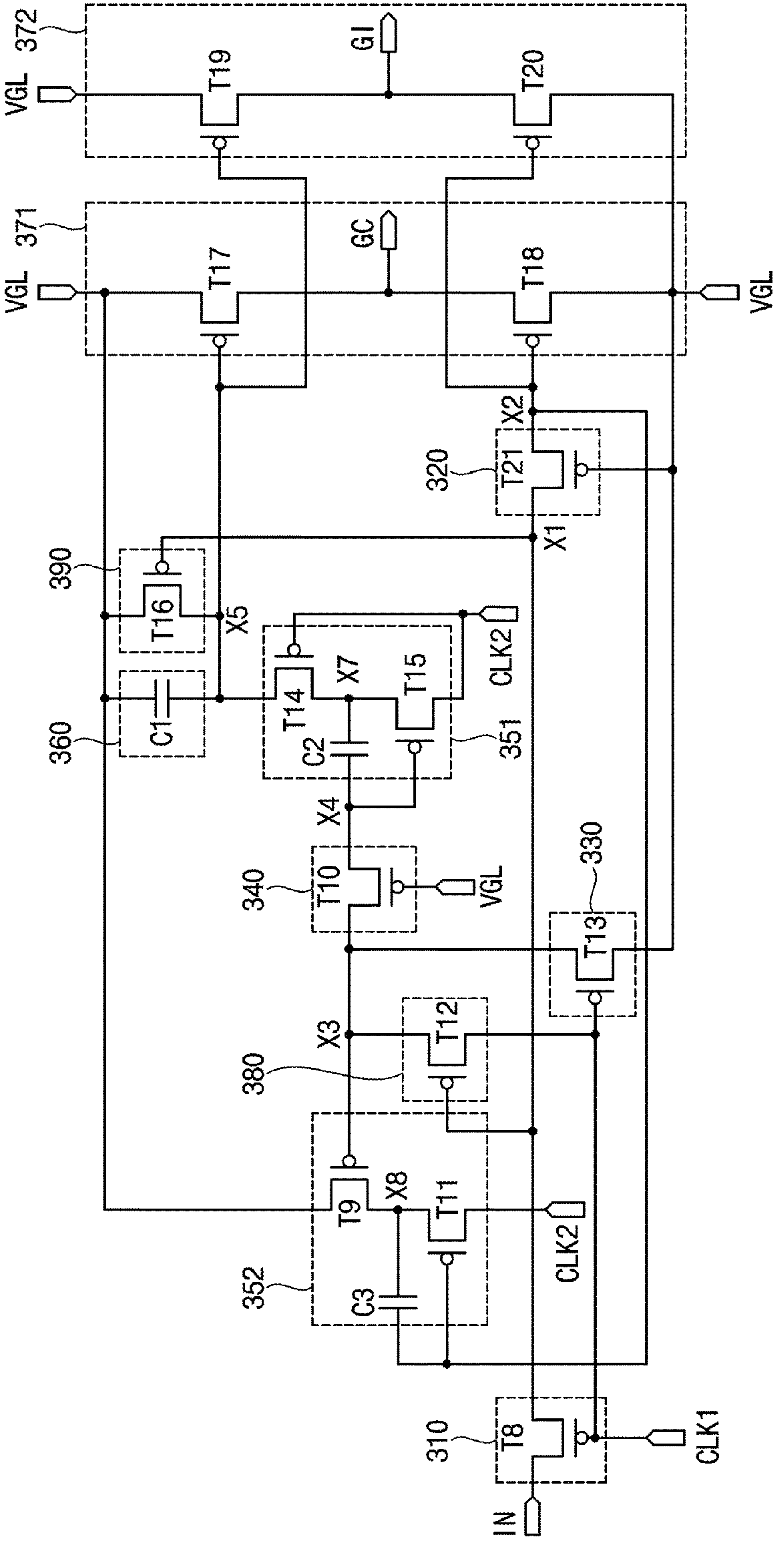
FIG. 12 is a circuit diagram illustrating an example of a third stage of the gate driver of FIG. 1 in the hold period.

FIG. 10 is a circuit diagram illustrating an example of the stage of the gate driver 300 of FIG. 1. FIG. 11 is a circuit diagram illustrating an example of the second stage S2 of the gate driver 300 of FIG. 1 in the hold period HP. FIG. 12 is a circuit diagram illustrating an example of the third stage S3 of the gate driver 300 of FIG. 1 in the hold period HP.

Referring to FIGS. 10 to 12, the first power voltage V1 may be a gate off voltage VGL (e.g. a low level). The second power voltage V2 of the first stage S1 and the third power voltage V3 of the first stage S1 may be a gate on voltage VGH (e.g. a high level). The second power voltage V2 of the second stage S2 may be the gate on voltage VGH. The third power voltage V3 of the second stage S2 may be the gate on voltage VGH in the data writing period DWP and may be the gate off voltage VGL in the hold period HP. The second power voltage V2 of the third stage S3 and the third power voltage V3 of the third stage S3 may be the gate on voltage VGH in the data writing period DWP, and may be the gate off voltage VGL in the hold period HP.

For example, only the gate-off voltage VGL may be output to the initialization gate signal output terminal of the second stage S2 in the hold period HP. For example, only the gate-off voltage VGL may be output to the compensation gate signal output terminal and the initialization gate signal output terminal of the third stage S3 in the hold period HP.

Figure 13:
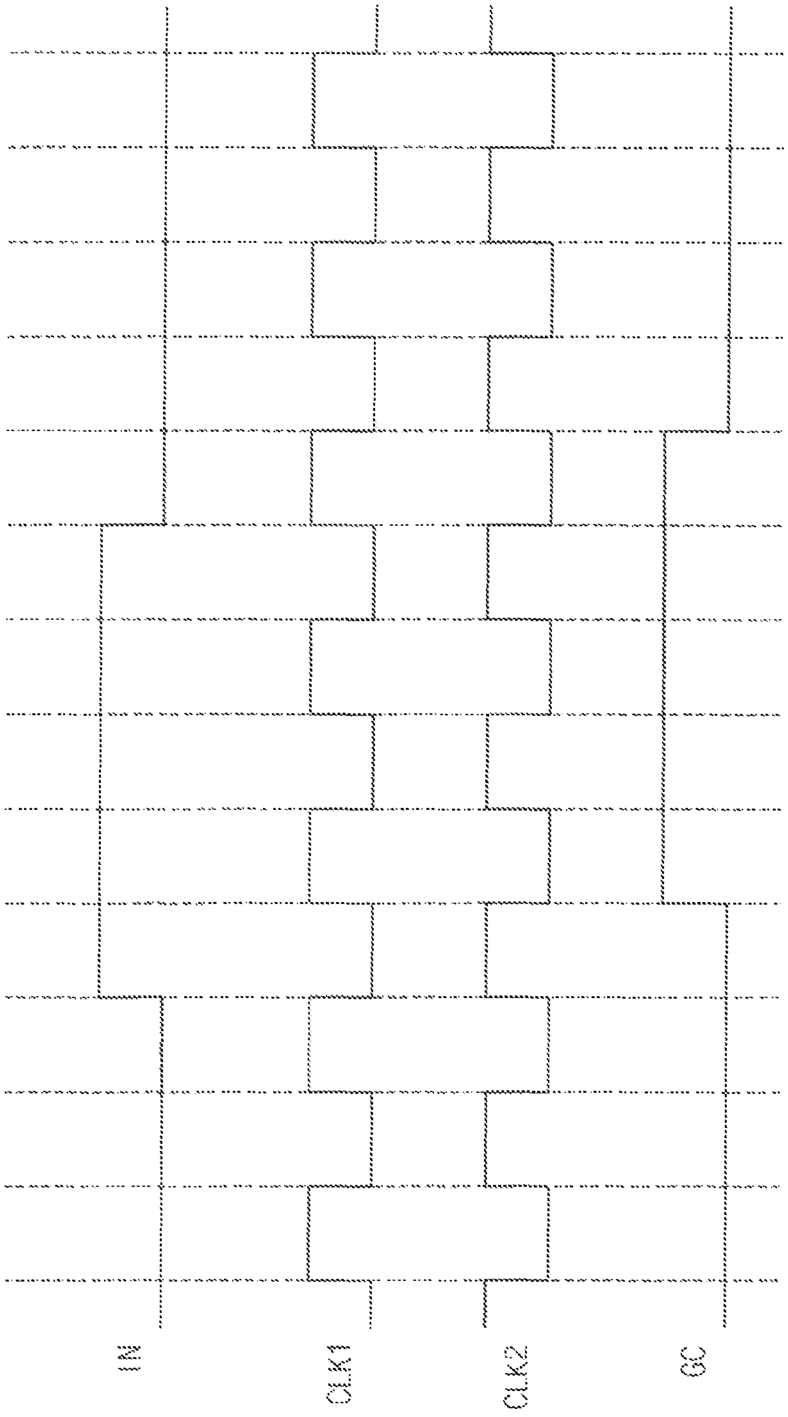
FIG. 13 is a diagram illustrating an input signal, a first clock signal, a second clock signal, and the gate compensation signal in a first stage of the gate driver of FIG. 1.
Figure 14:
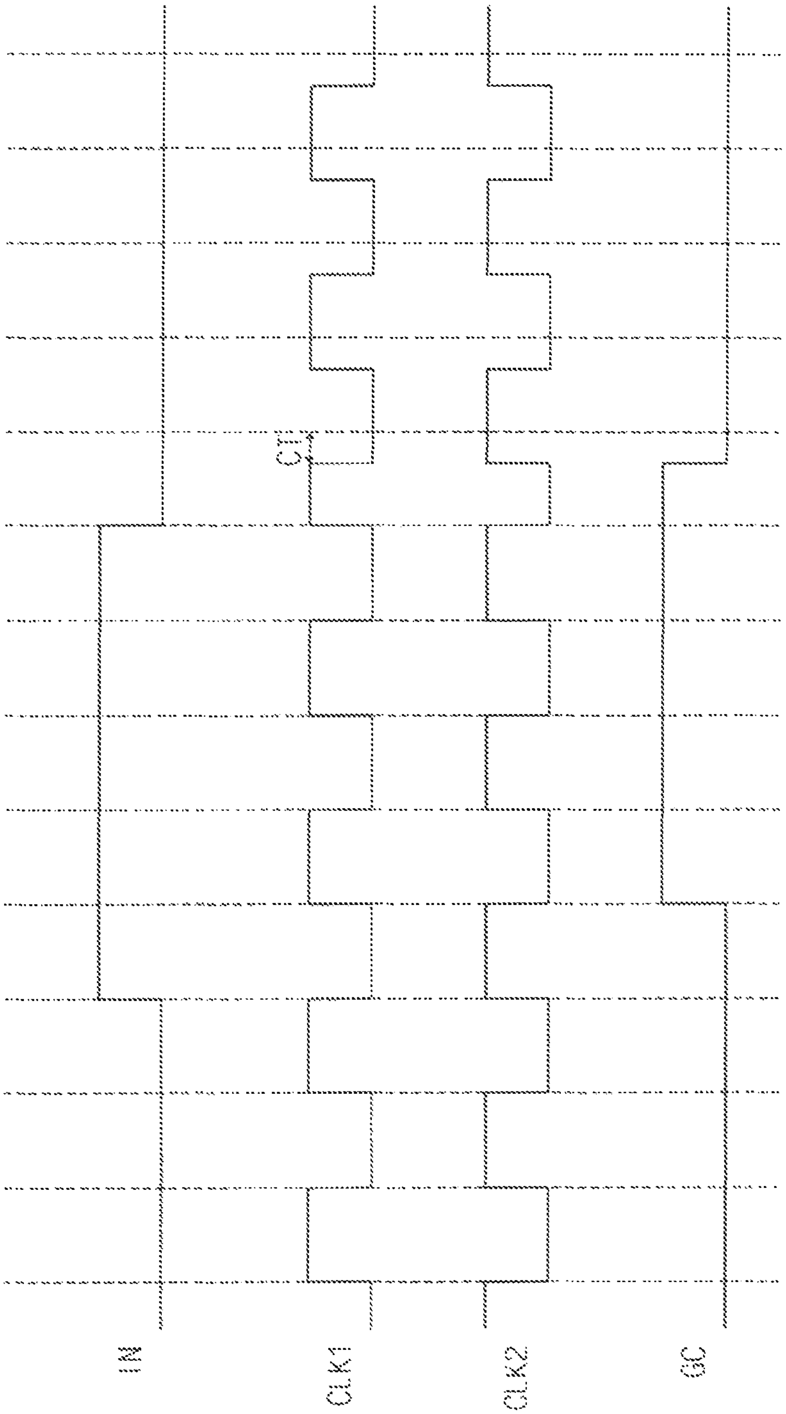
FIG. 14 is a diagram illustrating an input signal, a first clock signal, a second clock signal, and the gate compensation signal in the second stage of the gate driver of FIG. 1.
Figure 15:
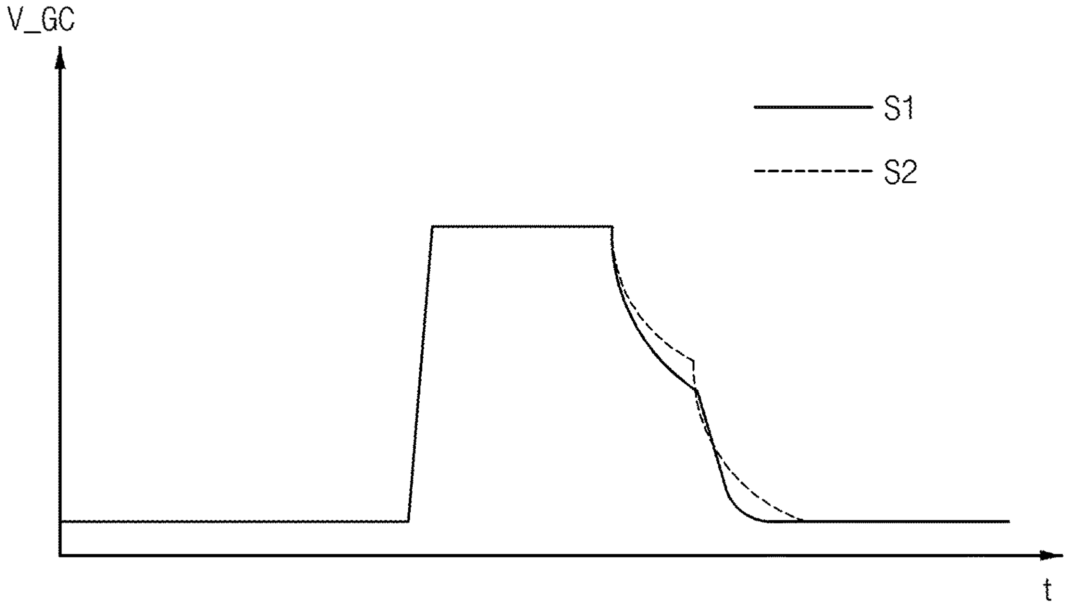
FIG. 15 is a graph illustrating a voltage value of the compensation gate signal provided to the display region by the first stage and a voltage value of the compensation gate signal provided to the display region by the second stage to which the same clock signal as the first stage is provided.

FIG. 13 is a diagram illustrating an input signal IN, a first clock signal CLK1, a second clock signal CLK2, and the gate compensation signal GC in a first stage S1 of the gate driver 300 of FIG. 1. FIG. 14 is a diagram illustrating the input signal IN, the first clock signal CLK1, the second clock signal CLK2, and the gate compensation signal GC in the second stage S2 of the gate driver 300 of FIG. 1. FIG. 15 is a graph illustrating a voltage value V_GC of the compensation gate signal provided to the display region 110 by the first stage S1 and a voltage value V_GC of the compensation gate signal GC provided to the display region 110 by the second stage S2 to which the same clock signal as the first stage S1 is provided. It is assumed that the compensation transistor T3 and the first initialization transistor T4 are NMOS transistors, the first stage S1 is configured of PMOS transistors, and the input signal IN and the compensation gate signal GC are in pulse on-state at the high level, and the first clock signal CLK1 and the second clock signal CLK2 are in the pulse on-state at the low level.

Referring to the FIGS. 8, 10, and 13, according to an exemplary embodiment, in the first stage S1, when the second clock signal CLK2 is in the pulse on-state after the input signal IN is in the pulse on-state and the first clock signal CLK1 is in the pulse on-state and, the compensation gate signal GC may be in the pulse on-state. According to an embodiment, in the first stage S1, when the first clock signal CLK1 is in the pulse on-state after the input signal IN is in the pulse off-state and the second clock signal CLK2 is in the pulse on-state, the compensation gate signal GC may be in the pulse off-state. According to an embodiment, in the second stage S2, the third stage S3, and the data writing period DWP, when the second clock signal CLK2 is in the pulse on-state after the input signal IN is in the pulse on-state and the first clock signal CLK1 is in the pulse on-state, the compensation gate signal GC may be in the pulse on-state. According to an embodiment, in the second stage S2, the third stage S3, and the data writing period, when the first clock signal CLK1 is in the pulse on-state after the input signal IN is in the pulse off-state and the second clock signal CLK2 is in the pulse on-state, the compensation gate signal GC may be in the pulse off-state.

The driving controller 200 may shift the first clock signal CLK1 and the second clock signal CLK2 to a time advanced by a compensation time CT, when the input signal IN is in the pulse off-state in a period in which the compensation gate signal GC provided to the display region 110 by the second stage S2 is in the pulse on-state. The compensation time CT may be determined based on a difference between a voltage value of the compensation gate signal GC provided to the display region 110 by the first stage S1 during a change from the pulse on-state to the pulse off-state and a voltage value of the compensation gate signal GC provided to the display region 110 by the second stage S2 during the change from the pulse on-state to the pulse off-state, when the first clock signal CLK1 equal to the first clock signal CLK1 provided to the first stage S1 and the second clock signal CLK2 equal to the second clock signal CLK2 provided to the first stage S1 are provided to the second stage S2 in the hold period HP. The compensation time CP may increase as the difference increases.

Referring to FIGS. 1, 10, 11, 14, and 15, when the gate-off voltage VGL is provided to the compensation gate signal output terminal after the gate-on voltage VGH is provided to the compensation gate signal output terminal in the hold period HP of the second stage S2, the gate-off voltage VGL may be continuously provided to the initialization gate signal terminal of the second stage S2. On the other hand, when the gate-off voltage VGL is provided to the compensation gate signal output terminal after the gate-on voltage VGH is provided to the compensation gate signal output terminal in the hold period HP of the first stage S1, the gate-off voltage VGL may be provided to the initialization gate signal terminal of the second stage S2 after the gate-on voltage VGH is provided to the initialization gate signal terminal of the second stage S2. According to an embodiment, since the initialization gate signal output terminal changes from the gate-on voltage VGH to the gate-off voltage VGL in the first stage S1, and the initialization gate signal output terminal continuously receives the gate-off voltage VGL in the second stage S2, a kick back occurs between a voltage of the second node X2 of the first stage S1 and a voltage of the second node X2 of the second stage S2. A voltage difference of the second node X2 may cause a voltage difference between the compensation gate signal GC of the first stage S1 and the compensation gate signal GC of the second stage S2. In this case, due to the voltage difference, a luminance difference may occur between a pixel PX to which the compensation gate signal GC is provided by the first stage S1 and a pixel PX to which the compensation gate signal GC is provided by the second stage S2. Accordingly, in order to reduce the voltage difference, the pulse duration of the compensation gate signal GC of the second stage S2 may be reduced. For example, when the voltage value V_GC of the compensation gate signal of the first stage S1 is smaller than the voltage value V_GC of the compensation gate signal of the second stage S2 due to the kick back, the luminance difference may be reduced by reducing a time when the compensation gate signal GC is outputted. For example, when the input signal IN is in the pulse off-state while the compensation gate signal GC of the second stage S2 is in the pulse on-state, the driving controller 200 may reduce the pulse duration of the compensation gate signal GC by shifting the first clock signal CLK1 and the second clock signal CLK2 to a time advanced by the compensation time CT. Since the pulse duration of the compensation gate signal GC is reduced as much the compensation time CT, the compensation time CT may increase as the voltage difference increases.

The stage of the embodiment of FIGS. 16 to 21 and the stage of FIG. 9 may have the same structure.

In embodiments of FIGS. 16 to 21, in a normal mode NM, the first power voltage V1 of the first stage S1, the second stage S2, and the third stage S3 may be the gate-off voltage VGL, and the second power voltage V2 and the third power voltage V3 may be the gate-on voltage VGH. In a multi frequency mode MFD, the second power voltage V2 of the first stage S1 and the third power voltage V3 of the first stage S1 may be the gate-on voltage VGH. In the multi frequency mode MFD, the second power voltage V2 of the second stage S2 may be the gate-on voltage VGH. In the multi frequency mode MFD, the third power voltage V3 of the second stage S2 may be the gate-on voltage VGH in the data writing period DWP and may be the gate-off voltage VGL in the hold period HP. In the multi frequency mode MFD, the second power voltage V2 of the third stage S3 and the third power voltage V3 of the third stage S3 may be the gate-on voltage VGH in the data writing period DWP, and may be the gate off voltage VGL in the hold period HP. The driving controller 200 may shift the first clock signal CLK1 and the second clock signal CLK2 to a time advanced by the compensation time CT in the multi frequency mode MFD, when the input signal IN is in a pulse off-state in a period in which the compensation gate signal GC provided to the display region 110 by the second stage S2 is in pulse on-state.

Figure 16:
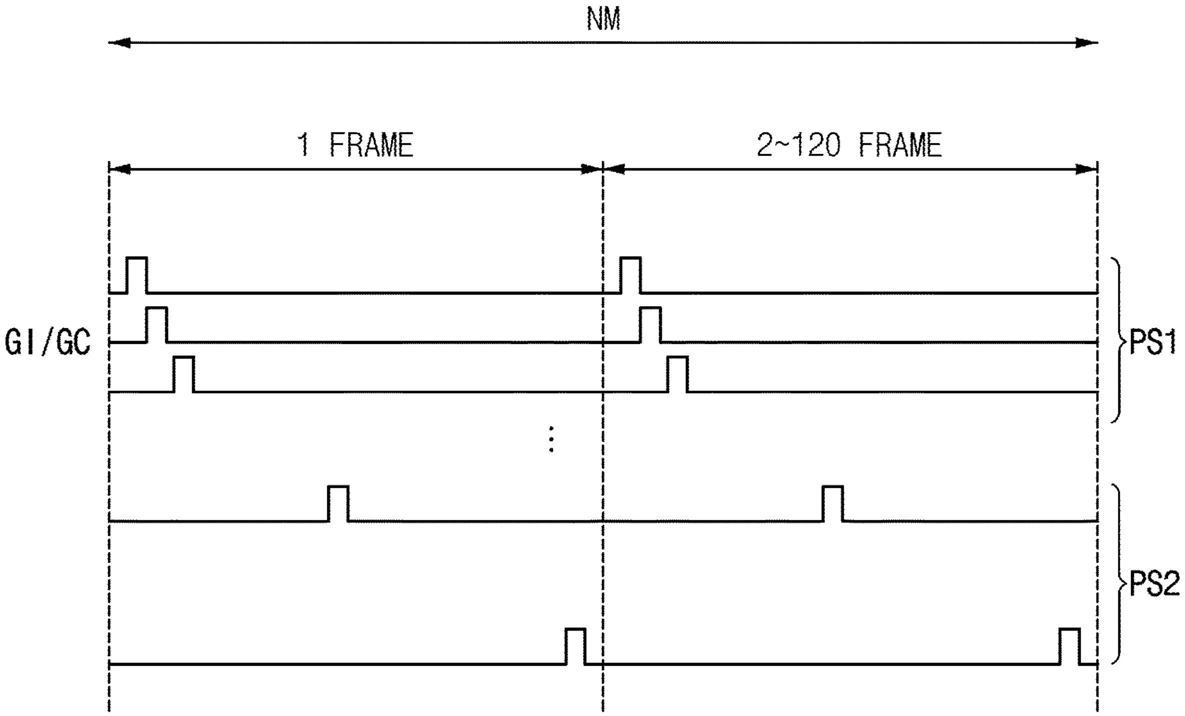
FIG. 16 is a diagram illustrating an example in which a gate driver according to an embodiment provides an initialization gate signal and a compensation gate signal to a display region in a data writing period and a hold period during a normal mode.
Figure 17:
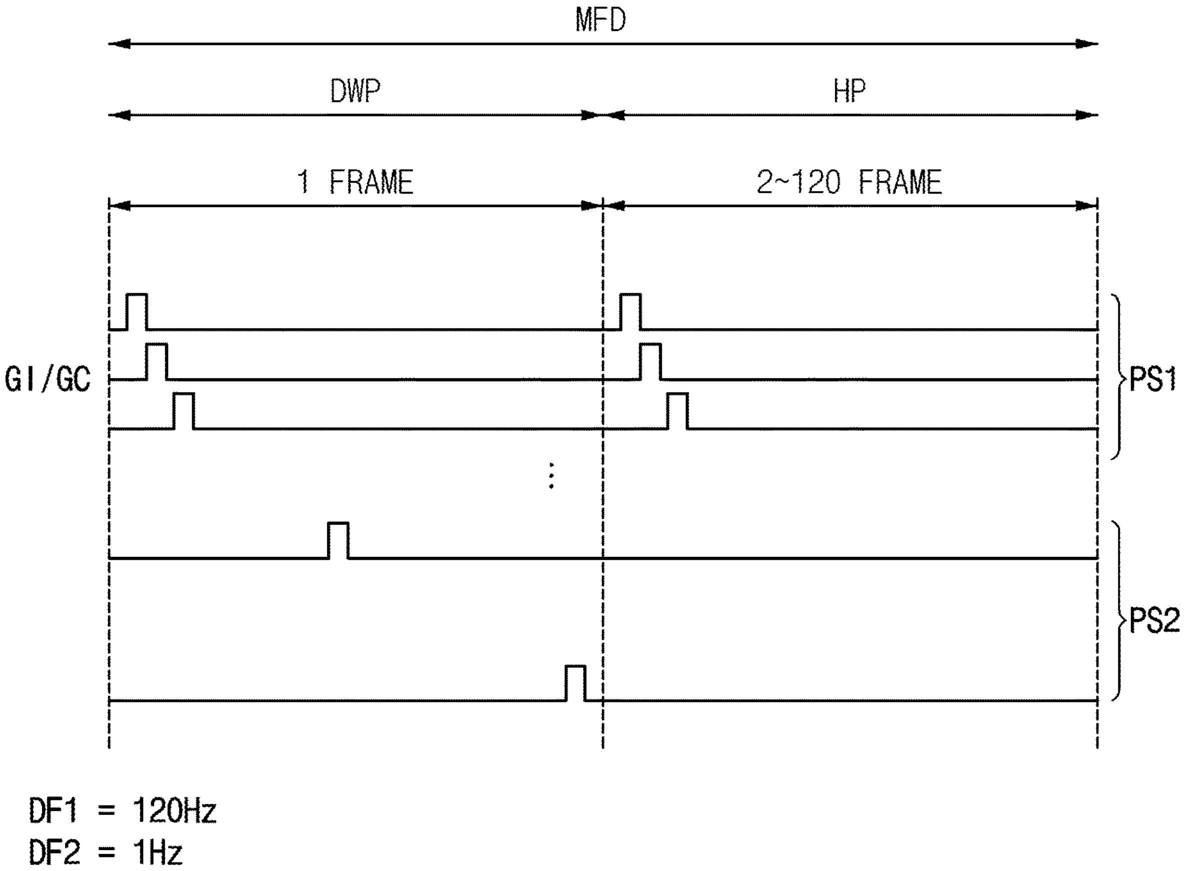
FIG. 17 is a diagram illustrating an example in which a gate driver according to an embodiment provides an initialization gate signal and a compensation gate signal to a display region in a data writing period and a hold period during a multi frequency mode.

FIG. 16 is a diagram illustrating an example in which the gate driver 300 according to an embodiment provides the initialization gate signal GI and the compensation gate signal GC to the display region 110 in the data writing period DWP and the hold period HP during a normal mode NM. FIG. 17 is a diagram illustrating an example in which the gate driver 300 according to an embodiment provides the initialization gate signal GI and the compensation gate signal GC to the display region 110 in the data writing period DWP and the hold period HP during the multi frequency mode MFD. FIGS. 16 and 17 are diagrams illustrating timings of the initialization gate signal GI and the compensation gate signal GC, and do not represent the extent to which the pulse on-states of the initialization gate signal GI and the compensation gate signal GC are maintained. The contents described with reference to FIGS. 1 to 15 may be equally applied in the multi-frequency mode MFD.

Referring to FIGS. 16 and 17, the driving controller 200 may determine a normal driving frequency for the display region 110 in a normal mode NM, a first driving frequency DF1 for the first display area PS1 in the multi frequency mode MFD, and a second driving frequency DF2 for the second display area PS2 in the multi frequency mode MFD. For example, in the normal mode NM, the first display area PS1 and the second display area PS2 may be driven in the same driving frequency. For example, in the normal mode NM, the data writing period DWP and the hold period HP may not be distinguished. In FIGS. 16 and 17, it is assumed that the first driving frequency DF1 is 120 Hz and the second driving frequency DF2 is 1 Hz. For example, in the multi frequency mode MFD, the data writing period DWP may include one frame, and the first display area PS1 and the second display area PS2, in the data writing period DWP, may receive the gate signals GC, GW, and GI. For example, in the multi frequency mode MFD, the hold period HP may include 119 frames (2 to 120 Frames), and the second display area PS2, in the hold period HP, may not receive the initialization gate signal GI and the compensation gate signal GC. In this case, the second display area PS2 may be driven in a different frequency from a frequency of the first display area PS1.

The first stage S1 may provide the compensation gate signal GC synchronized to the first driving frequency DF1 and the initialization gate signal GI synchronized to the first driving frequency DF1 to the display region 110 in the multi frequency mode MFD. The first stage S1 may provide the compensation gate signal GC synchronized to the normal driving frequency and the initialization gate signal GI synchronized to the normal driving frequency to the display region 110 in the normal mode NM. The second stage S2 may provide the compensation gate signal GC synchronized to the first driving frequency DF1 and the initialization gate signal GI synchronized to the second driving frequency DF2 to the display region 110 in the multi frequency mode MFD. The second stage S2 may provide the compensation gate signal GC synchronized to the normal driving frequency and the initialization gate signal GI synchronized to the normal driving frequency in the normal mode NM. The third stage S3 may provide the compensation gate signal GC synchronized to the second driving frequency DF2 and the initialization gate signal GI synchronized to the second driving frequency DF2 to the display region 110 in the multi frequency mode MFD. The third stage S3 may provide the compensation gate signal GC synchronized to the normal driving frequency and the initialization gate signal GI synchronized to the normal driving frequency in the normal mode NM.

Figure 18:
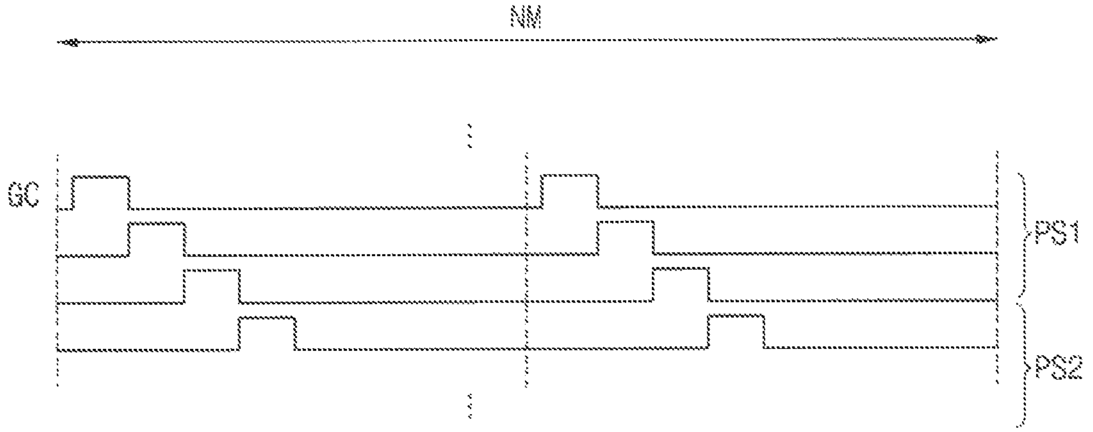
FIG. 18 is a diagram illustrating an example in which a gate driver according to an embodiment provides a compensation gate signal to a display region in a data writing period and a hold period during a normal mode.
Figure 19:
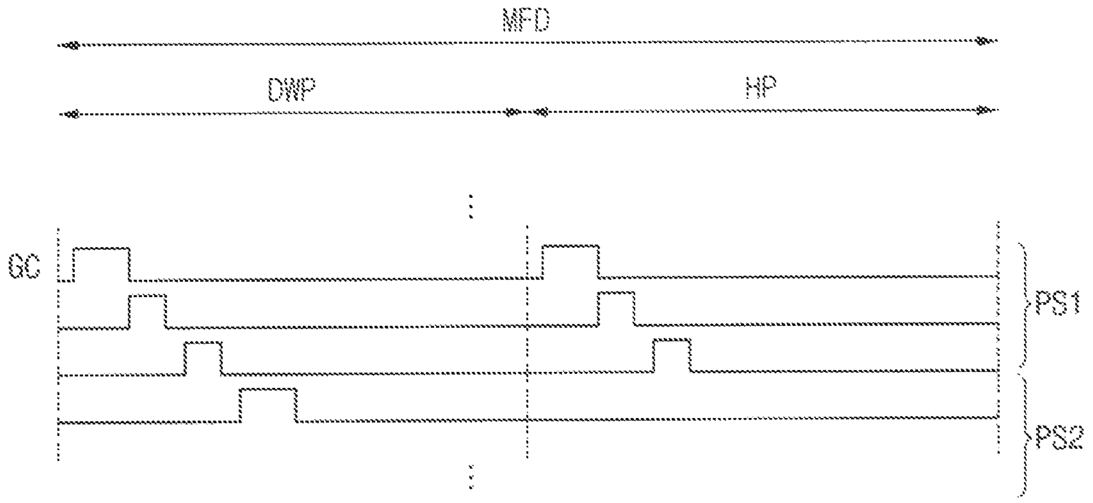
FIG. 19 is a diagram illustrating an example in which a gate driver according to an embodiment provides a compensation gate signal to a display region in a data writing period and a hold period during a multi frequency mode.
Figure 20:
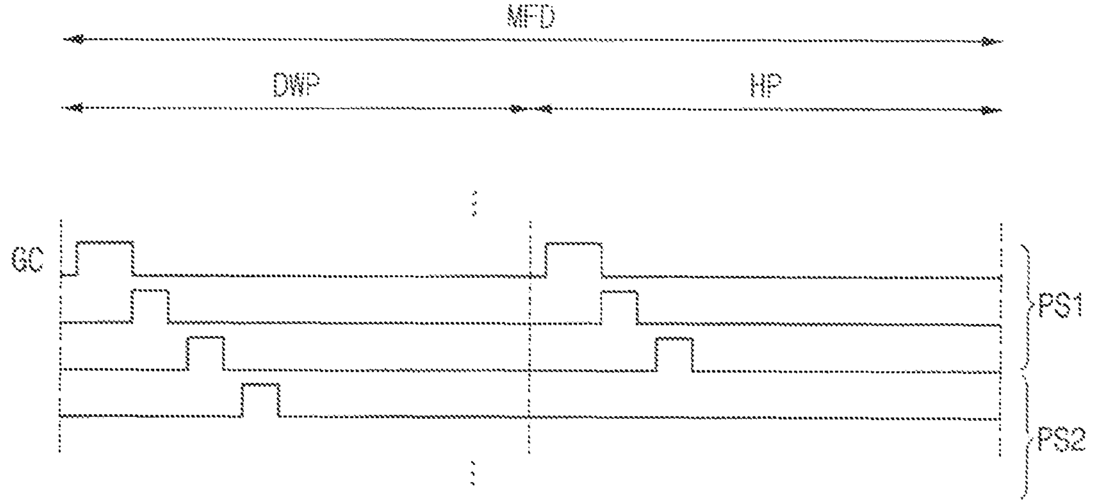
FIG. 20 is a diagram illustrating an example in which a gate driver according to an embodiment provides a compensation gate signal to a display region in a data writing period and a hold period during a multi-frequency mode.
Figure 21:
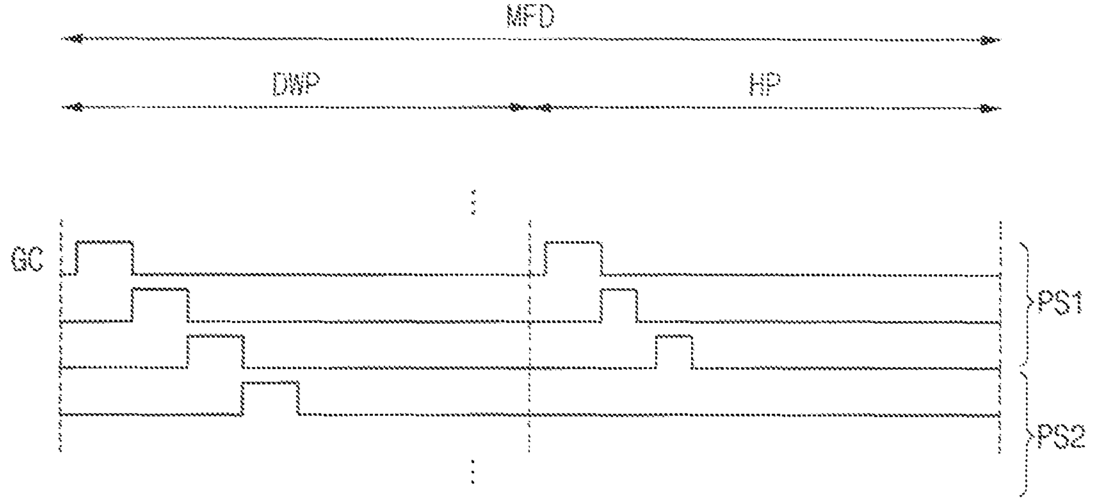
FIG. 21 is a diagram illustrating an example in which a gate driver according to an embodiment provides a compensation gate signal to a display region in a data writing period and a hold period during a multi-frequency mode.

FIG. 18 is a diagram illustrating an example in which the gate driver 300 according to an embodiment provides the compensation gate signal GC to the display region 110 in the data writing period DWP and the hold period HP during the normal mode NM. FIG. 19 is a diagram illustrating an example in which the gate driver 300 according to an embodiment provides the compensation gate signal GC to the display region 110 in the data writing period DWP and the hold period HP during the multi frequency mode MFD. FIG. 20 is a diagram illustrating an example in which the gate driver 300 according to an embodiment provides the compensation gate signal GC to the display region 110 in the data writing period DWP and the hold period HP during the multi-frequency mode MFD. FIG. 21 is a diagram illustrating an example in which the gate driver 300 according to an embodiment provides the compensation gate signal GC to the display region 110 in the data writing period DWP and the hold period HP during the multi-frequency mode MFD. In FIGS. 18 to 21, a first compensation gate signal GC is the compensation gate signal GC provided to the display region 110 in the first stage S1, and a second compensation signal and a third compensation gate signal GC are the compensation gate signal GC provided to the display region 110 in the second stage S2, and a fourth compensation gate signal GC is the compensation gate signal GC provided to the display region 110 in the third stage S3. That is, in FIGS. 18 to 21, the first, second, and third compensation gate signals GC are provided to the first display region PS1, and the fourth compensation gate signal GC is provided to the second display region PS2.

Referring to FIGS. 3 and 18, the pulse duration of the compensation gate signal GC provided to the display region 110 in each of the stages of the gate driver 300 may be the same in the normal mode NM. Also, the data writing period DWP and the hold period HP may not be distinguished in the normal mode NM.

Referring to FIGS. 3 and 19, the second stage S2 may provide the compensation gate signal GC having the pulse duration shorter than the pulse duration of the compensation gate signal GC provided to the display region 110 by the first stage S1 in the multi frequency mode MFD. It is assumed that second and third compensation gate signals GC of FIG. 19 may be compensation gate signals GC provided to the display region 110 in the second stage S2. For example, as shown in FIG. 19, the pulse duration of the second and third compensation gate signals GC of FIG. 19 may be shorter than pulse duration of the other compensation gate signals GC of FIG. 19. The pulse duration of the compensation gate signal GC may mean a time during which the compensation gate signal GC is provided to the display region 110.

Referring to FIGS. 3 and 20, the second stage S2 and third stage S3 may provide the compensation gate signal GC having the pulse duration shorter than the pulse duration of the compensation gate signal GC provided to the display region 110 by the first stage S1 in the multi frequency mode MFD. It is assumed that a first compensation gate signal GC of FIG. 20 may be a compensation gate signal GC provided to the display region 110 by the first stage S1, second and third compensation gate signals GC of FIG. 20 may be compensation gate signals GC provided to the display region 110 by the second stage S2, and a fourth compensation gate signal GC of FIG. 20 may be a compensation gate signal GC provided to the display region 110 by the third stage S3. For example, as shown in FIG. 20, pulse duration of the second, third, and fourth compensation gate signals GC are shorter than pulse duration of the first compensation gate signal GC.

Referring to FIGS. 3 and 21, in the data writing period DWP of the multi frequency mode MFD, the second stage S2 may provide the compensation gate signal GC having the pulse duration equal to the pulse duration of the compensation gate signal GC provided to the display region 110 by the first stage S1 in the data writing period DWP. The second stage S2 may provide the compensation gate signal GC having the pulse duration shorter than the pulse duration of the compensation gate signal GC provided to the display region 110 by the first stage S1 in the hold period HP of the multi frequency mode MFD. In the data writing period DWP of the multi frequency mode MFD, the first stage S1, the second stage S2, and the third stage S3 may provide the compensation gate signal GC and the initialization gate signal GI to the display region 110. Thus, the pulse duration of the compensation gate signal GC may be constant. In the hold period HP of the multi frequency mode MFD, the second stage S2 may provide the compensation gate signal GC to the display region 110 and may not provide the initialization gate signal GI to the display region 110. Accordingly, in the hold period HP of the multi frequency mode MFD, the pulse duration of the compensation gate signal GC provided by the second stage S2 may be short.

Figure 22:
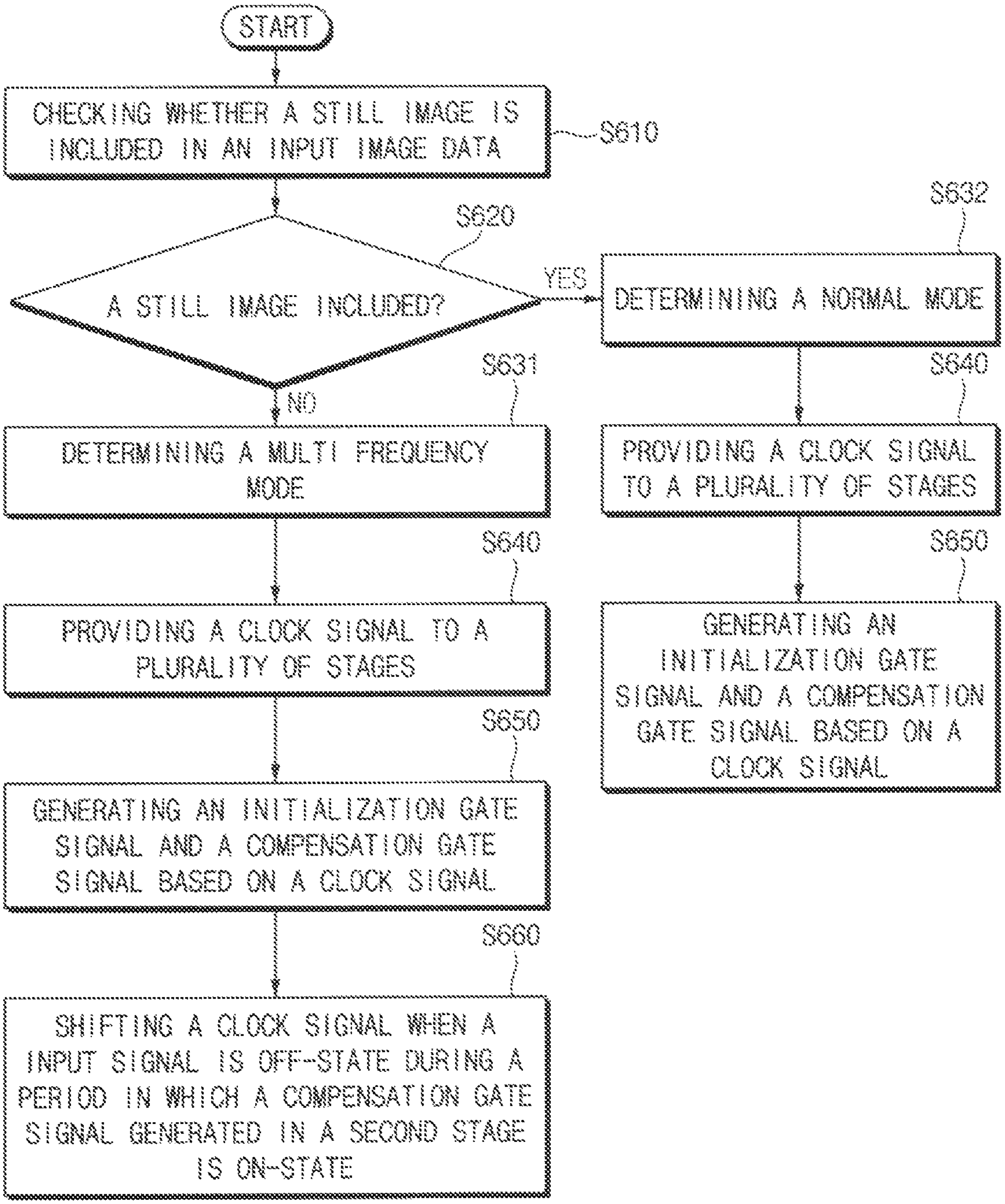
FIGS. 22 and 23 are flowcharts illustrating a method of driving a display apparatus according to embodiments of the present inventive concept.
Figure 23:
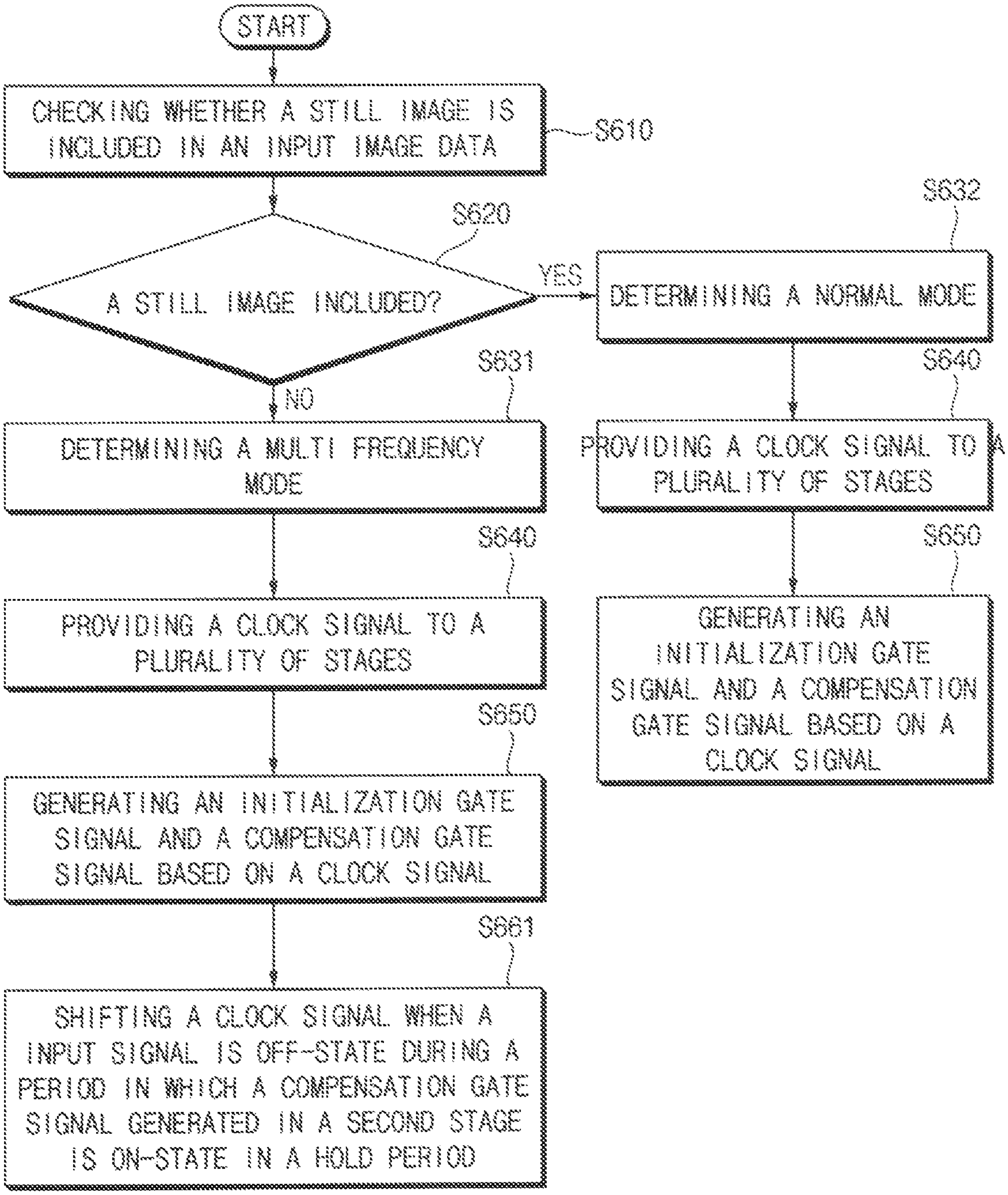

FIGS. 22 to 23 are flowcharts illustrating a method of driving a display apparatus according to embodiments of the present inventive concept.

Referring to FIGS. 22 to 23, the method of driving the display apparatus 1000 of FIG. 22 may check whether a still image is included in the input image data IMG (operation S610). The method of driving the display apparatus 1000 of FIG. 22 may determine a driving mode of the display apparatus 1000 as the multi frequency mode MFD when the input image data IMG includes the still image, and determine the driving mode of the display apparatus 1000 as the normal mode NM when the input image data IMG does not include the still image (operations S620, S631, and S632). Specifically, when the normal mode NM is determined, the display apparatus 1000 may determine the normal driving frequency, and when the multi frequency mode MFD is determined, the display apparatus 1000 may determine the first driving frequency DF1 and the second driving frequency DF2. The method of driving the display apparatus 1000 of FIG. 22 may provide the clock signal to the plurality of stages included the first stage S1, the second stage S2, and the third stage S3 (operation S640). The method of driving the display apparatus 1000 of FIG. 22 may generate the initialization gate signal GI and the compensation gate signal GC based on the clock signal and the input signal IN in the stages (operation S650). The display apparatus 1000 may display image based on the compensation gate signal GC and the initialization gate signal GI. The method of driving display apparatus 1000 of FIG. 22 may shift the clock signal to a time advanced by the compensation time CT, when the input signal IN is in the pulse off-state in a period in which the compensation gate signal GC generated in the second stage S2 disposed between the first stage S1 and the second stage S2 is in pulse on-state (operation S660). In an embodiment, the method of driving display apparatus 1000 of FIG. 23 may shift the clock signal to a time advanced by the compensation time CT in the hold period HP of the multi frequency mode MFD, when the input signal IN is in the pulse off-state in a period in which the compensation gate signal GC generated in the second stage S2 disposed between the first stage S1 and the second stage S2 is in pulse on-state (operation S661).

As mentioned above, the display apparatus 1000 and the method of driving the display apparatus 1000 according to embodiments may provide the compensation gate signal GC having a relatively short pulse duration to the area where the first display area PS1 and the second display area PS2 meet so that the luminance difference may be reduced by lowering the voltage at the gate of a driving transistor T1. In addition, by shifting the clock signals CLK1 and CLK2 provided to the second stage S2 to a time advanced by the compensation time CT, the pulse duration of the compensation gate signal GC may be reduced to reduce the luminance difference.

The inventive concepts may be applied any electronic device including the display apparatus 1000. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function.

What is claimed is:

1. A display apparatus comprising:

a display panel including a display region that includes a first display area and a second display area;

a data driver configured to provide a data voltage to the display region;

a gate driver configured to provide a compensation gate signal and an initialization gate signal to the display region, the gate driver including a first stage and a second stage; and a driving controller configured to control the gate driver and the data driver, wherein the driving controller is configured to determine a first driving frequency for the first display area and a second driving frequency for the second display area, wherein the first and second stages are each configured to receive an input signal having a pulse-on state and a pulse-off state; and wherein the second stage is configured to provide the compensation gate signal having a pulse duration shorter than a pulse duration of the compensation gate signal provided to the display region by the first stage when the first and second stages both receive the pulse-off state.

2. The display apparatus of claim 1, wherein the gate driver further comprises a third stage, wherein the first stage is configured to provide the compensation gate signal synchronized to the first driving frequency and the initialization gate signal synchronized to the first driving frequency to the display region, wherein the second stage is configured to provide the compensation gate signal synchronized to the first driving frequency and the initialization gate signal synchronized to the second driving frequency to the display region, and wherein the third stage is configured to provide the compensation gate signal synchronized to the second driving frequency and the initialization gate signal synchronized to the second driving frequency to the display region.

3. The display apparatus of claim 2, wherein the second stage is disposed between the first stage and the third stage.

4. The display apparatus of claim 2, wherein the first stage is configured to provide the compensation gate signal and the initialization gate signal to the first display area, wherein the second stage is configured to provide the compensation gate signal to the first display area and the initialization gate signal to the second display area, and wherein the third stage is configured to provide the compensation gate signal and the initialization gate signal to the second display area.

5. The display apparatus of claim 1, wherein the second stage provides the compensation gate signal having the pulse duration equal to the pulse duration of the compensation gate signal provided to the display region by the first stage in a data writing period, and wherein the second stage provides the compensation gate signal having the pulse duration shorter than the pulse duration of the compensation gate signal provided to the display region by the first stage in a hold period.

6. The display apparatus of claim 1, wherein a P-th (P is a positive integer) stage of the gate driver is configured to provide the compensation gate signal to a Q-th (Q is a positive integer) pixel row of the display region, and to provide the initialization gate signal to a (Q+N)-th (N is a positive integer) pixel row of the display region, and wherein a number of the second stages is N.

7. The display apparatus of claim 1, wherein a pixel of the display region comprises:

a driving transistor configured to generate a driving current;

a switching transistor configured to transmit the data voltage or a blank voltage to a source of the driving transistor in response to a writing gate signal;

a compensation transistor configured to connect the driving transistor in a diode-connection in response to the compensation gate signal;

a storage capacitor configured to store a voltage where a threshold voltage of the driving transistor is subtracted from the data voltage;

a first initialization transistor configured to provide a first initialization voltage to a gate of the driving transistor and the storage capacitor in response to the initialization gate signal;

a first emission transistor configured to connect a line of a pixel power voltage to the source of the driving transistor in response to an emission signal;

a second emission transistor configured to connect a drain of the driving transistor to an emission element in response to the emission signal;

a second initialization transistor configured to provide a second initialization voltage to the emission element in response to the writing gate signal for pixels of a next pixel row; and the emission element configured to emit light based on the driving current.

8. The display apparatus of claim 1, wherein each of stages of the gate driver comprises:

an input part configured to transmit the input signal to a first node in response to a first clock signal;

a first stress relieving part disposed between the first node and a second node and configured to transmit a voltage of the first node to the second node;

a first transmitting part configured to transmit a first power voltage to a third node in response to the first clock signal;

a second stress relieving part disposed between the third node and a fourth node and configured to transmit a voltage of the third node to the fourth node;

a first bootstrap part configured to bootstrap the fourth node based on a second clock signal;

a maintaining part configured to maintain a voltage of a fifth node;

a compensation gate signal output part configured to output a second power voltage as the compensation gate signal in response to the voltage of the fifth node;

an initialization gate signal output part configured to output a third power voltage as the initialization gate signal in response to the voltage of the fifth node;

a second bootstrap part configured to bootstrap the second node based on the second clock signal;

a second transmitting part configured to transmit the first clock signal to the third node in response to the voltage of the first node; and a third transmitting part configured to transmit the second power voltage to the fifth node in response to the voltage of the first node.

9. The display apparatus of claim 8, wherein the first power voltage is a gate off voltage, wherein a second power voltage of the first stage and a third power voltage of the first stage are a gate on voltage, wherein a second power voltage of the second stage is the gate on voltage, wherein a third power voltage of the second stage is the gate on voltage in a data writing period and is the gate off voltage in a hold period, and wherein a second power voltage of the third stage and a third power voltage of the third stage are the gate on voltage in the data writing period, and are the gate off voltage in the hold period.

10. The display apparatus of claim 9, wherein the driving controller is configured to shift the first clock signal and the second clock signal to a time advanced by a compensation time, when the input signal is in a pulse off-state in a period in which the compensation gate signal provided to the display region by the second stage is in a pulse on-state.

11. The display apparatus of claim 10, wherein the compensation time is determined based on a difference between a voltage value of the compensation gate signal provided to the display region by the first stage during a change from the pulse on-state to the pulse off-state and a voltage value of the compensation gate signal provided to the display region by the second stage during the change from the pulse on-state to the pulse off-state, when the first clock signal equal to the first clock signal provided to the first stage and the second clock signal equal to the second clock signal provided to the first stage are provided to the second stage in the hold period.

12. The display apparatus of claim 11, wherein the compensation time increases as the difference increases.

13. A display apparatus comprising:

a display panel including a display region including a first display area and a second display area;

a data driver configured to provide a data voltage to the display panel;

a gate driver configured to provide a compensation gate signal and an initialization gate signal to the display region, and including a first stage and a second stage; and a driving controller configured to control the gate driver and the data driver, wherein the driving controller is configured to determine a normal driving frequency for the display region in a normal mode, a first driving frequency for the first display area in a multi frequency mode, and a second driving frequency for the second display area in the multi frequency mode, wherein the first and second stages are each configured to receive an input signal having a pulse-on state and a pulse-off state, and wherein the second stage is configured to provide the compensation gate signal having a pulse duration shorter than a pulse duration of the compensation gate signal provided to the display region by the first stage in the multi frequency mode when the first and second stages both receive the pulse-off state.

14. The display apparatus of claim 13, wherein the first stage is configured to provide the compensation gate signal synchronized to the first driving frequency and the initialization gate signal synchronized to the first driving frequency to the display region in the multi frequency mode, and provide the compensation gate signal synchronized to the normal driving frequency and the initialization gate signal synchronized to the normal driving frequency to the display region in the normal mode, and wherein the second stage is configured to provide the compensation gate signal synchronized to the first driving frequency and the initialization gate signal synchronized to the second driving frequency to the display region in the multi frequency mode, and provide the compensation gate signal synchronized to the normal driving frequency and the initialization gate signal synchronized to the normal driving frequency to the display region in the normal mode.

15. The display apparatus of claim 14, wherein the gate driver further comprises a third stage, wherein the third stage is configured to provide the compensation gate signal synchronized to the second driving frequency and the initialization gate signal synchronized to the second driving frequency to the display region in the multi frequency mode, and provide the compensation gate signal synchronized to the normal driving frequency and the initialization gate signal synchronized to the normal driving frequency to the display region in the normal mode.

16. The display apparatus of claim 15, wherein each of stages of the gate driver comprises:

an input part configured to transmit the input signal to a first node in response to a first clock signal;

a first stress relieving part disposed between the first node and a second node and configured to transmit a voltage of the first node to the second node;

a first transmitting part configured to transmit a first power voltage to a third node in response to the first clock signal;

a second stress relieving part disposed between the third node and a fourth node and configured to transmit a voltage of the third node to the fourth node;

a first bootstrap part configured to bootstrap the fourth node based on a second clock signal;

a maintaining part configured to maintain a voltage of a fifth node;

a compensation gate signal output part configured to output a second power voltage as the compensation gate signal in response to the voltage of the fifth node;

an initialization gate signal output part configured to output a third power voltage as the initialization gate signal in response to the voltage of the fifth node;

a second bootstrap part configured to bootstrap the second node based on the second clock signal;

a second transmitting part configured to transmit the first clock signal to the third node in response to the voltage of the first node; and a third transmitting part configured to transmit the second power voltage to the fifth node in response to the voltage of the first node.

17. The display apparatus of claim 16, wherein, in the normal mode, a first power voltage of the first stage, the second stage and the third stage is a gate off voltage, and a second power voltage of the first stage, the second stage and the third stage and a third power voltage of the first stage, the second stage and the third stage are a gate on voltage, wherein, in the multi frequency mode, the second power voltage of the first stage and the third power voltage of the first stage are the gate on voltage, wherein, in the multi frequency mode, the second power voltage of the second stage is the gate on voltage, wherein, in the multi frequency mode, the third power voltage of the second stage is the gate on voltage in a data writing period and is the gate off voltage in a hold period, and wherein, in the multi frequency mode, the second power voltage of the third stage and the third power voltage of the third stage are the gate on voltage in the data writing period and are the gate off voltage in the hold period.

18. The display apparatus of claim 17, wherein, in the multi frequency mode, the driving controller is configured to shift the first clock signal and the second clock signal to a time advanced by a compensation time, when the input signal is in a pulse off-state in a period in which the compensation gate signal provided to the display region by the second stage is in a pulse on-state.

19. A method of driving a display apparatus, the method comprising:

determining a driving mode of the display apparatus as a multi frequency mode when an input image data includes a still image;

determining the driving mode of the display apparatus as a normal mode when the input image data does not include the still image;

providing a clock signal to a plurality of stages including a first stage, a second stage, and a third stage;

generating an initialization gate signal and a compensation gate signal based on the clock signal and an input signal in the stages; and shifting, in the multi frequency mode, the clock signal to a time advanced by a compensation time, when the input signal is in a pulse off-state in a period in which the compensation gate signal generated in the second stage disposed between the first stage and the third stage is in pulse on-state.

20. The method of claim 19, wherein the shifting the clock signal is performed in a hold period of the multi frequency mode.

* * * * *